(12) United States Patent
Horie et al.

(10) Patent No.: US 8,241,530 B2
(45) Date of Patent: Aug. 14, 2012

(54) METAL SEPARATOR FOR FUEL CELL AND METHOD FOR PRODUCING THE SAME

(75) Inventors: Toshio Horie, Seto (JP); Gaku Kitahara, Aichi-gun (JP); Nobuaki Suzuki, Nisshin (JP); Hiroyuki Mori, Nisshin (JP); Ken-ichi Suzuki, Nagoya (JP); Isamu Ueda, Kasugai (JP); Kazuaki Nishino, Seto (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 942 days.

(21) Appl. No.: 12/299,491

(22) PCT Filed: May 18, 2007

(86) PCT No.: PCT/JP2007/060184
§ 371 (c)(1),
(2), (4) Date: Nov. 4, 2008

(87) PCT Pub. No.: WO2007/142007
PCT Pub. Date: Dec. 13, 2007

(65) Prior Publication Data
US 2009/0202736 A1    Aug. 13, 2009

(30) Foreign Application Priority Data

| Jun. 2, 2006 | (JP) | 2006-154134 |
| Oct. 11, 2006 | (JP) | 2006-277148 |
| Nov. 27, 2006 | (JP) | 2006-318782 |
| Nov. 27, 2006 | (JP) | 2006-318783 |
| Mar. 30, 2007 | (JP) | 2007-093915 |

(51) Int. Cl.
*H01B 1/04* (2006.01)
*C23C 8/72* (2006.01)
*B05D 5/12* (2006.01)

(52) U.S. Cl. ............ 252/519.12; 252/520.22; 252/521.5
(58) Field of Classification Search ............. 252/519.12, 252/520.22, 521.4, 521.5; 420/417
See application file for complete search history.

(56) References Cited

U.S. PATENT DOCUMENTS
4,528,120 A * 7/1985 Hunold et al. ............... 252/516
(Continued)

FOREIGN PATENT DOCUMENTS
EP     0787683 A1 *  8/1997
(Continued)

OTHER PUBLICATIONS

Shtansky et al "The structure and Properties of Ti-B-N, Ti-Si-B-N, Ti-Si-C-N and Ti-Al-C-N coatings . . . ", Journal of Materials and Processing, 6(1) 1998 pp. 61-72.*

(Continued)

*Primary Examiner* — Mark Kopec
(74) *Attorney, Agent, or Firm* — Oblon, Spivak, McClelland, Maier & Neustadt, L.L.P.

(57) ABSTRACT

There is provided an electron conductive and corrosion-resistant material 3 containing titanium (Ti), boron (B) and nitrogen (N) in an atomic ratio satisfying $0.05 \leq [Ti] \leq 0.40$, $0.20 \leq [B] \leq 0.40$, and $0.35 \leq [N] \leq 0.55$ (provided that $[Ti]+[B]+[N]=1$). Further, there is provided a method of manufacturing an electron conductive and corrosion-resistant material 3, wherein boron nitride powder adheres to the surface of a substrate 2 of which at least the surface is made of titanium or a titanium alloy, and is then heated. Furthermore, there is provided a method of manufacturing an electron conductive and corrosion-resistant material 3, wherein the surface of a substrate 2 of which at least the surface is made of titanium or a titanium alloy is borided and then heated. In addition, there is provided a method of manufacturing an electron conductive and corrosion-resistant material 3, wherein a $TiB_2$ layer formed of $TiB_2$ particles is formed by spraying $TiB_2$ powder onto a metal substrate 2 and then nitriding the $TiB_2$ layer.

22 Claims, 31 Drawing Sheets

U.S. PATENT DOCUMENTS

| | | | |
|---|---|---|---|
| 5,518,556 A | 5/1996 | Weber et al. | |
| 5,851,680 A * | 12/1998 | Heau | 428/472 |
| 6,635,939 B2 * | 10/2003 | Agarwal et al. | 257/412 |
| 2004/0257915 A1 | 12/2004 | Miyama | |

FOREIGN PATENT DOCUMENTS

| | | |
|---|---|---|
| JP | 47-45868 | 12/1972 |
| JP | 49 9438 | 1/1974 |
| JP | 55-161063 | 12/1980 |
| JP | 61-104077 | 5/1986 |
| JP | 4-28855 | 1/1992 |
| JP | 5-78811 | 3/1993 |
| JP | 05-140725 | 6/1993 |
| JP | 6 346222 | 12/1994 |
| JP | 2000 123850 | 4/2000 |
| JP | 2000 353531 | 12/2000 |
| JP | 2001-025843 | 1/2001 |
| JP | 2003-82452 | 3/2003 |
| JP | 2004 273370 | 9/2004 |
| JP | 2004-279169 | 10/2004 |
| JP | 2004-339562 | 12/2004 |
| JP | 2005 264235 | 9/2005 |
| JP | 2005-268081 | 9/2005 |

OTHER PUBLICATIONS

Japanese Office Action issued Aug. 2, 2011, in Patent Application No. 2007-093915 (with English-language translation).

Office Action issued Sep. 7, 2010, in Japan Patent Application No. 2007-093915 (with English-language translation).

Notification of Reasons for Refusal issuded Jun. 12, 2012, in Japanese Patent Application No. 2007-093915, filed Mar. 30, 2007 (with English translation).

* cited by examiner

METAL SEPARATOR FOR FUEL CELL AND METHOD FOR PRODUCING THE SAME

TECHNICAL FIELD

The present invention relates to an electron conductive and corrosion-resistant material that contains titanium, boron, and nitrogen, and a method of manufacturing the electron conductive and corrosion-resistant material.

BACKGROUND ART

Since having excellent energy conversion efficiency, a fuel cell such as a polymer electrolyte fuel cell (PEFC) has attracted attention as a next-generation energy source.

For example, a polymer electrolyte fuel cell includes a unit cell structure 9 as shown in FIG. 1. As shown in FIG. 1, in the unit cell structure 9, a positive electrode 92 and a negative electrode 93 are laminated so that a solid polymer electrolyte membrane 91 is interposed between the electrodes, and a pair of bipolar plates 94 and 95 is laminated so that the laminated body including the positive electrode 92, the solid polymer electrolyte membrane 91, and the negative electrode 93 is interposed between the bipolar plates. Grooves 96 used as oxygen gas (air) supplying passages and grooves 97 used as hydrogen gas supplying passages are formed on the bipolar plates 94 and 95, respectively. A fuel cell is generally formed by laminating a plurality of the unit cell structures 9.

In the unit cell structure 9, oxygen (air) is supplied to the grooves 96 of the bipolar plate 94 facing the positive electrode 92, and hydrogen is supplied to the grooves 97 of the bipolar plate 95 facing the negative electrode 93. Further, in the negative electrode 93, hydrogen is decomposed into electrons and hydrogen ions ($H^+$). Meanwhile, in the positive electrode 92, oxygen reacts to the hydrogen ions and electrons, and water is generated. It is possible to generate an electromotive force between the electrodes 92 and 93 by the reactions in the positive and negative electrodes 92 and 93.

Metal bipolar plates having excellent impact resistance are used as the bipolar plates 94 and 95 of the fuel cell. Since also having excellent formability, as shown in FIG. 1, the metal bipolar plate is also advantageous in forming the grooves 96 and 97 on the bipolar plates 94 and 95. Further, in terms of the prevention of the increase of the internal resistance of the fuel cell, there is a demand for the bipolar plate to have small contact resistance and excellent electron conductance.

Furthermore, the bipolar plates 94 and 95 of the fuel cell are exposed to the hydrogen ion generated in the negative electrode 93 or oxygen supplied to the positive electrode 92. If the bipolar plates 94 and 95 are corroded by the hydrogen ions or dissolved oxygen, there is a danger that the internal resistance of the fuel cell is increased because the electron conductance of the bipolar plate decreases. For this reason, the bipolar plates 94 and 95 are required to have excellent corrosion resistance against the hydrogen ions or oxygen.

For example, the following bipolar plate has been developed as the metal bipolar plate for the fuel cell.

That is, for example, there has been a bipolar plate, which is composed of a thin plate made of titanium, a titanium alloy, or stainless steel on which noble metal is plated (see Patent Document 1).

Further, there has been a bipolar plate including a metal material layer that is made of Ti or the like, and a protective layer that covers the metal material layer and is made of Ti nitride or Ti-alloy nitride (see Patent Document 2).

Furthermore, there has been a titanium-based material for a bipolar plate that is manufactured by adding boron origin such as $AlB_{12}$ during the manufacture of a titanium substrate and precipitating TiB boride particles (see Patent Document 3).

However, the bipolar plate disclosed in Patent Document 1 has excellent corrosion resistance and stability, but uses rare noble metal. Therefore, there has been a problem in that the manufacturing cost of the bipolar plate is significantly high. Further, if the amount of noble metal to be used is decreased to reduce the cost, plating adhesion deteriorates. For this reason, there has been a danger that the plated noble metal film is peeled. Furthermore, when a plated film is formed on a thin plate (substrate) made of, for example, Al or SUS (stainless steel), a local cell is formed at a pinhole of the plated layer. For this reason, there has been a danger that local corrosion such as pitting corrosion is generated on the substrate.

In addition, since having insufficient corrosion resistance, the bipolar plate disclosed in Patent Document 2 is relatively easily corroded by hydrogen ions and the like. For this reason, there has been a danger that contact resistance is increased.

Further, the titanium-based material for a bipolar plate, which is disclosed in Patent Document 3, is composed of a substrate where TiB-based boride is dispersed, but the substrate has problems in terms of ductility and formability. For this reason, it is difficult to manufacture a thin plate, or to shape the bipolar plate. Furthermore, during the forming or the operation of the fuel cell, the TiB-based boride is apt to be separated from the substrate, and there is a danger that corrosion occurs from the separated portion. In addition, the amount of boride may be decreased in order to improve the ductility and formability. However, in this case, the boride exposed to the surface is decreased, and there is a danger that a contact area between a portion having electron conductance and other members is decreased. As a result, there is a danger that contact resistance is increased.

[Patent Document 1] JP2000-123850 Unexamined Patent Publication (Kokai)
[Patent Document 2] JP2000-353531 Unexamined Patent Publication (Kokai)
[Patent Document 3] JP2004-273370 Unexamined Patent Publication (Kokai)

DISCLOSURE OF THE INVENTION

Problem to be Solved by the Invention

The present invention has been accomplished in views of the conventional problems and an object of the present invention is to provide an electron conductive and corrosion-resistant material that has excellent electron conductivity and corrosion-resistance which is manufactured at low cost, and a method of manufacturing the electron conductive and corrosion-resistant material.

Means for Solving the Problems

According to a first aspect of the present invention, there is provided an electron conductive and corrosion-resistant material and it is characterized by containing at least titanium, boron, and nitrogen, wherein titanium (Ti), boron (B), and nitrogen (N) are contained in an atomic ratio satisfying $0.05 \leq [Ti] \leq 0.40$, $0.20 \leq [B] \leq 0.40$, and $0.35 \leq [N] \leq 0.55$ (provided that $[Ti]+[B]+[N]=1$).

As described above, the electron conductive and corrosion-resistant material contains titanium (Ti), boron (B), and nitrogen (N) in an atomic ratio satisfying $0.05 \leq [Ti] \leq 0.40$, $0.20 \leq$

[B]≦0.40, and 0.35≦[N]≦0.55 (provided that [Ti]+[B]+[N]=1). The excellent electron conductive and corrosion-resistant material having such an atomic composition ratio can have excellent electron conductivity and corrosion resistance. Therefore, if the electron conductive and corrosion-resistant material is applied to, for example, a metal bipolar plate for a fuel cell, it is possible to form a metal bipolar plate for the fuel cell that can stably provide excellent characteristics.

The reason why the electron conductive and corrosion-resistant material can provide excellent electron conductivity and corrosion resistance as described above is not clear, but is thought that Ti of the electron conductive and corrosion-resistant material containing Ti, B, and N can exist while approaching a stable quadrivalent element. In contrast, for example, $TiB_2$ or TiN or the like is also an electron conductive material, but the valence of Ti is significantly out of 4. Therefore, $TiB_2$ or TiN or the like has the electron conductivity but is apt to be corroded by water and dissolved oxygen. The electron conductive and corrosion-resistant material contains at least Ti, B, and N. Accordingly, as expected from the periodic table, Ti can exist while approaching a stable quadrivalent element. For this reason, as described above, it is understood that electron conductivity is maintained and corrosion resistance is improved. Further, the reason why the electron conductive and corrosion-resistant material has excellent conductive property is thought that the electron conductive and corrosion-resistant material containing at least Ti, B, and N has crystal structure where electrons exist in a conduction band.

According to a second aspect of the present invention, there is provided a method of manufacturing an electron conductive and corrosion-resistant material characterized by containing at least titanium, boron, and nitrogen, the method comprising:

an adhesion step of making boron nitride powder adhere to the surface of a substrate of which at least the surface is made of titanium or a titanium alloy; and a heating step of forming a film of electron conductive and corrosion-resistant material on the substrate by heating the substrate to which the boron nitride powder adheres under a non-oxidizing gas atmosphere or in a vacuum at a temperature of 500 to 1650° C.

The manufacturing method includes the adhesion step and the heating step.

In the adhesion step, boron nitride powder adheres to the surface of the substrate. In the heating step, the substrate to which the boron nitride powder adheres is heated under the above-mentioned specific condition. As a result, it is possible to form the film of the electron conductive and corrosion-resistant material on the substrate.

The electron conductive and corrosion-resistant material formed on the substrate has excellent electron conductivity and also has excellent corrosion resistance. Accordingly, the substrate on which the electron conductive and corrosion-resistant material is formed has small contact resistance, and is suitable for, for example, the metal bipolar plate for the fuel cell. Therefore, it is possible to decrease the internal resistance of the fuel cell. Further, the electron conductive and corrosion-resistant material has excellent corrosion resistance. Accordingly, if the substrate on which the electron conductive and corrosion-resistant material is formed is used as the bipolar plate for a fuel cell, the bipolar plate is hardly corroded by acid (hydrogen ions), oxygen, or the like to be supplied to the fuel cell. Therefore, it is possible to prevent contact resistance from increasing due to corrosion. In this way, the substrate on which the electron conductive and corrosion-resistant material is formed is suitable for the metal bipolar plate for the fuel cell, and the fuel cell on which the metal bipolar plate for the fuel cell is mounted provides stable performance for a long time.

Meanwhile, it has been generally known that boron nitride is stable at high temperature. The reason why the electron conductive and corrosion-resistant material is formed by the manufacturing method is not clear, but is thought that titanium, which is very active and apt to generate boride or nitride, comes in contact with boron nitride and reacts to each other, so that a material having excellent electron conductivity and corrosion resistance is generated. Further, it may also be thought that lattice distortion occurs in the crystal structure due to the interaction between the boron nitride, which has been generally known as an electric insulating material, and titanium, so that electron conductivity is provided.

In the manufacturing method, it is possible to simply manufacture the electron conductive and corrosion-resistant material by the adhesion step and the heating step. Considering the application as the metal bipolar plate for the fuel cell, expensive noble metal does not need to be used unlike the metal bipolar plate in the related art. Therefore, it is possible to manufacture the metal bipolar plate for the fuel cell, which has excellent electron conductivity and corrosion resistance, at low cost.

As described above, according to the second aspect of the present invention, it is possible to provide a method of manufacturing an electron conductive and corrosion-resistant material that can manufacture an electron conductive and corrosion-resistant material having excellent conductivity and corrosion resistance at low cost.

According to a third aspect of the present invention, there is provided a method of manufacturing an electron conductive and corrosion-resistant material characterized by containing at least titanium, boron, and nitrogen, the method comprising:

a boriding step of forming a Ti-boride layer which contains at least Ti and B on the surface of a substrate by boriding the surface of the substrate of which at least the surface is made of titanium or a titanium alloy; and a nitriding step of forming the film of the electron conductive and corrosion-resistant material on the substrate by nitriding the Ti-boride layer.

The manufacturing method includes the boriding step and the nitriding step.

In the boriding step, the surface of the substrate of which at least the surface is made of titanium or a titanium alloy is borided. Accordingly, it is possible to form a Ti-boride layer, which contains at least Ti and B, on the surface of the substrate.

Further, in the nitriding step, the Ti-boride layer formed on the substrate is nitrided. Accordingly, it is possible to form the film of the electron electron conductive and corrosion-resistant material on the substrate.

The electron conductive and corrosion-resistant material has excellent electron conductivity and also has excellent corrosion resistance. Accordingly, the substrate on which the electron conductivity and corrosion-resistant material is formed has small contact resistance, and is suitable for, for example, the metal bipolar plate for the fuel cell. Therefore, it is possible to decrease the internal resistance of the fuel cell. Further, the electron conductive and corrosion-resistant material has excellent corrosion resistance. Accordingly, if the substrate on which the electron conductive and corrosion-resistant material is formed is used as the bipolar plate for the fuel cell, the bipolar plate is hardly corroded by acid (hydrogen ions), oxygen, or the like to be supplied to the fuel cell. Therefore, it is possible to prevent the contact resistance from increasing due to corrosion. In this way, the substrate on which the electron conductive and corrosion-resistant material is formed is suitable for the metal bipolar plate for the fuel cell, and the fuel cell on which the metal bipolar plate for the fuel cell is mounted exhibits stable performance for a long time.

The reason why the electron conductive and corrosion-resistant material obtained by the manufacturing method can provide excellent electron conductivity and corrosion resistance as described above is not clear, but is thought that Ti of the electron conductive and corrosion-resistant material containing Ti, B, and N can exist while approaching a stable quadrivalent element. In contrast, for example, $TiB_2$ or TiN or the like is also a conductive material, but the valence of Ti is significantly out of 4. Therefore, $TiB_2$ or TiN or the like has electron conductivity but is apt to be corroded by water and dissolved oxygen. The electron conductive and corrosion-resistant material contains at least Ti, B, and N. Accordingly, as expected from the periodic table, Ti can exist while approaching a stable quadrivalent element. For this reason, as described above, it is understood that electron conductivity is maintained and corrosion resistance is improved. Further, the reason why the electron conductive and corrosion-resistant material has excellent electron conductivity is thought that the electron conductive and corrosion-resistant material containing at least Ti, B, and N has crystal structure where electrons exist in a conduction band.

As described above, the electron conductive and corrosion-resistant material obtained by the manufacturing method contains a new material different from $TiB_2$ and TiN, and it is thought that the material contributes to electron conductivity and the corrosion resistance.

Furthermore, in the manufacturing method, it is possible to simply manufacture the electron conductive and corrosion-resistant material by the boriding step and the nitriding step. Considering the application as the metal bipolar plate for the fuel cell, the expensive noble metal does not need to be used unlike the metal bipolar plate in the related art. Therefore, it is possible to manufacture the metal bipolar plate for the fuel cell, which has excellent electron conductivity and corrosion resistance, at low cost.

As described above, according to the third aspect of the present invention, it is possible to provide a method of manufacturing an electron conductive and corrosion-resistant material that can manufacture an electron conductive and corrosion-resistant material having excellent electron conductivity and corrosion resistance at low cost.

According to a fourth aspect of the present invention, there is provided a method of manufacturing an electron conductive and corrosion-resistant material characterized by containing at least titanium, boron, and nitrogen, the method comprising:

a thermal spraying step of forming a $TiB_2$ layer formed of $TiB_2$ particles by spraying $TiB_2$ powder onto at least a part of the surface of a metal substrate; and a nitriding step of forming the film of electron conductive and corrosion-resistant material on the metal substrate by nitriding the $TiB_2$ layer.

The manufacturing method includes the thermal spraying step and the nitriding step.

In the thermal spraying step, $TiB_2$ powder is sprayed onto at least a part of the surface of the metal substrate. In the nitriding step, the $TiB_2$ particles sprayed onto the surface of the metal substrate are nitrided. Accordingly, it is possible to form the film of the electron conductive and corrosion-resistant material on the metal substrate.

The electron conductive and corrosion-resistant material has excellent electron conductivity and also has excellent corrosion resistance. Accordingly, the metal substrate on which the electron conductive and corrosion-resistant material is formed has small contact resistance, and is suitable for, for example, the metal bipolar plate for the fuel cell. Therefore, it is possible to decrease the internal resistance of the fuel cell. Further, the electron conductive and corrosion-resistant material has excellent corrosion resistance. Accordingly, if the metal substrate on which the electron conductive and corrosion-resistant material is formed is used as the bipolar plate for the fuel cell, the bipolar plate is hardly corroded by acid (hydrogen ions), oxygen, or the like to be supplied to the fuel cell. Therefore, it is possible to prevent contact resistance from increasing due to corrosion. In this way, the metal substrate on which the electron conductive and corrosion-resistant material is formed is suitable for the metal bipolar plate for the fuel cell, and the fuel cell on which the metal bipolar plate for the fuel cell maintains stable performance for a long time.

The reason why the electron conductive and corrosion-resistant material obtained by the manufacturing method can provide excellent electron conductivity and corrosion resistance as described above is not clear, but is thought that Ti of the electron conductive and corrosion-resistant material containing Ti, B, and N can exist while approaching a stable quadrivalent element. In contrast, for example, $TiB_2$ or TiN or the like is also an electric conductive material, but the valence of Ti is significantly out of 4. Therefore, $TiB_2$ or TiN or the like has electron conductivity but is apt to be corroded by water and dissolved oxygen. The electron conductive and corrosion-resistant material contains at least Ti, B, and N. Accordingly, as expected from the periodic table, Ti can exist while approaching a stable quadrivalent element. For this reason, as described above, it is understood that electron conductivity is maintained and corrosion resistance is improved.

Further, the reason why the electron conductive and corrosion-resistant material has excellent electron conductivity is thought that the electron conductive and corrosion-resistant material containing at least Ti, B, and N has crystal structure where electrons exist in a conduction band.

As described above, the electron conductive and corrosion-resistant material obtained by the manufacturing method contains a new material that contains Ti, B, and N, and it is thought that the material contributes to electron conductivity and corrosion resistance.

Furthermore, in the manufacturing method, it is possible to simply manufacture the electron conductive and corrosion-resistant material by the thermal spraying step and the nitriding step. Considering the application as the metal bipolar plate for the fuel cell, expensive noble metal does not need to be used unlike the metal bipolar plate in the related art. Therefore, it is possible to manufacture the metal bipolar plate for the fuel cell, which has excellent electron conductivity and corrosion resistance, at low cost.

As described above, according to the fourth aspect of the present invention, it is possible to provide a method of manufacturing an electron conductive and corrosion-resistant material that can manufacture an electron conductive and corrosion-resistant material having excellent electron conductivity and corrosion resistance at low cost.

BEST MODE FOR CARRYING OUT THE INVENTION

Figure 1:
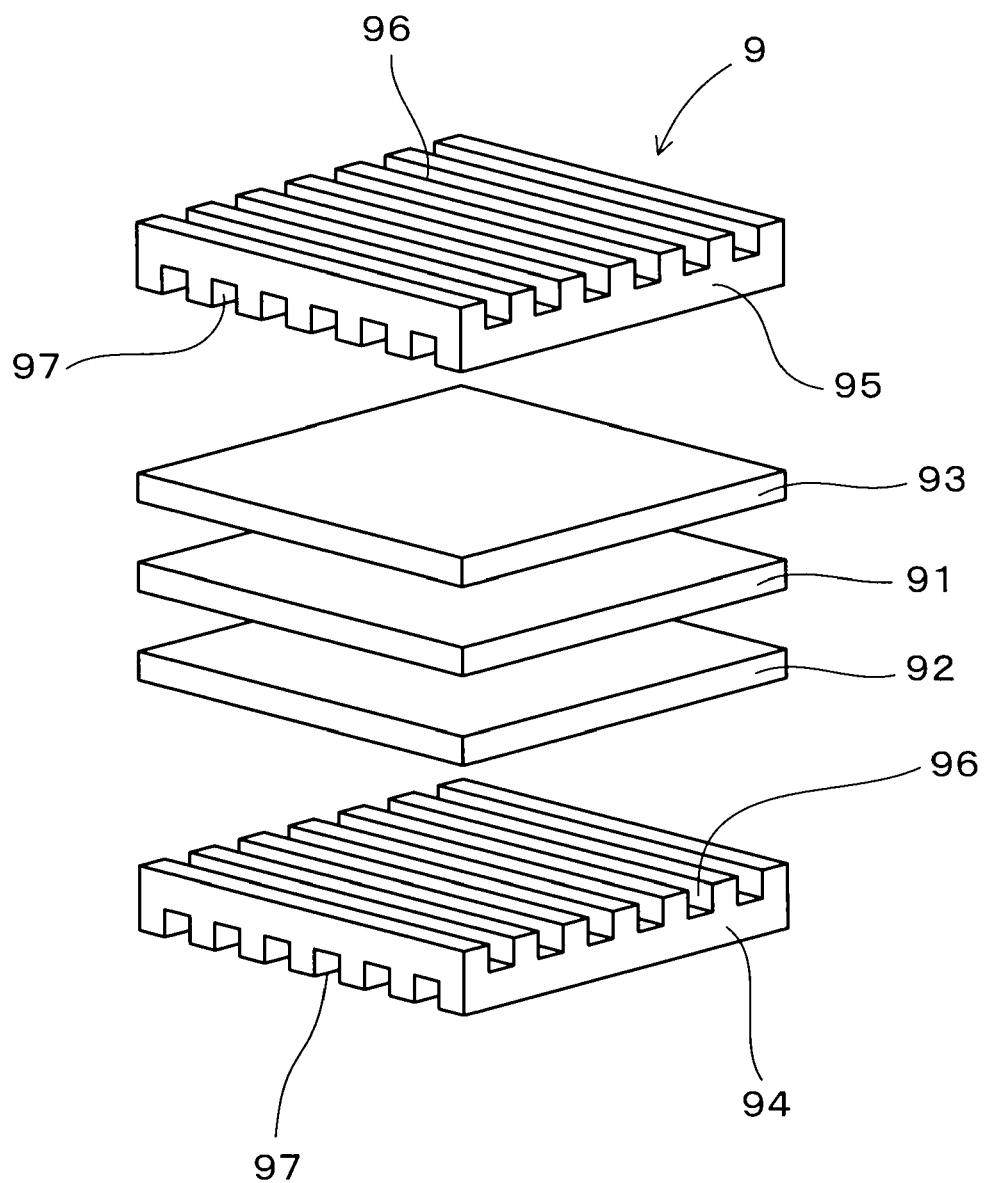
FIG. 1 is a developed view of an example of a unit cell structure of a fuel cell.

A preferred embodiment of a first aspect of the present invention will be described below.

An electron conductive and corrosion-resistant material according to a first aspect of the present invention contains titanium (Ti), boron (B), and nitrogen (N) in an atomic ratio satisfying $0.05 \leq [Ti] \leq 0.40$, $0.20 \leq [B] \leq 0.40$, and $0.35 \leq [N] \leq 0.55$ (provided that $[Ti]+[B]+[N]=1$). If the atomic ratio of each of Ti, B, and N elements is out of the above-mentioned range, there is a danger that electron conductivity or corrosion resistance of the electron conductive and corrosion-resistant material deteriorate.

If X-ray diffraction (XRD) measurement is performed using the electron conductive and corrosion-resistant material by a Cu—Kα ray, it is possible to obtain an XRD pattern that shows peaks when 2θ is 29.1±0.1°, 41.7±0.1°, and 42.2±0.10, and does not show peaks when 2θ is 46.4±0.1 and 48.9±0.1°. Meanwhile, during the measurement of the X-ray diffraction, the peak means a highest position (peak top) of the peak of the X-ray diffraction pattern that is obtained by measuring the X-ray diffraction.

Further, the electron conductive and corrosion-resistant material may contain C or O as inevitable elements. It is thought that the inevitable elements are mixed to the electron conductive and corrosion-resistant material because moisture or contaminants or the like from the atmosphere, a solvent, and materials adhering to the surface of a substrate are adsorbed to the electron conductive and corrosion-resistant material during the manufacture of the electron conductive and corrosion-resistant material, or the inevitable elements are mixed to the electron conductive and corrosion-resistant material because moisture or contaminants or the like from the atmosphere are adsorbed to the electron conductive and corrosion-resistant material during analysis. The inevitable elements are detected by the spectrum of the X-ray photoelectron spectroscopy (XPS).

It is preferable that the electron conductive and corrosion-resistant material be formed as a film covering a substrate of which at least the surface is made of titanium or a titanium alloy.

In this case, for example, according to second to fourth aspects of the present invention, it is possible to simply manufacture the electron conductive and corrosion-resistant material. Further, in this case, the substrate, which includes the electron conductive and corrosion-resistant material having excellent electron conductivity and corrosion resistance formed on the surface thereof, may be used as a metal bipolar plate for the fuel cell or the like, and that material is possible to sufficiently maintain excellent electron conductivity and corrosion resistance.

It is preferable that the electron conductive and corrosion-resistant material formed on the substrate is used as a metal bipolar plate for a fuel cell together with the substrate.

In this case, that material is possible to sufficiently maintain excellent electron conductivity and corrosion resistance. It has excellent electron conductivity and corrosion resistance.

Next, a preferred embodiment of a second aspect of the present invention will be described.

In a manufacturing method according to a second aspect of the present invention, the adhesion step and the heating step are performed to manufacture the electron conductive and corrosion-resistant material.

First, in the adhesion step, boron nitride powder adheres to the surface of the substrate.

At least the surface of the substrate is made of titanium or a titanium alloy. Specifically, a substrate, which is made of, for example, titanium, a titanium alloy, or a Ti—SUS (stainless steel) clad material, may be used as the substrate. Further, a substrate where titanium or a titanium alloy is coated on the surface of a plate made of metal, such as stainless steel or aluminum, may be used as the substrate.

Furthermore, it is preferable that grooves used as passages for hydrogen, oxygen, and air are formed on the surface of the substrate. In this case, it is possible to form the electron conductive and corrosion-resistant material on the substrate including the grooves by performing the adhesion step and the heating step. The substrate on which the electron conductive and corrosion-resistant material obtained as described above is formed includes the grooves used as passages for hydrogen, oxygen, and air on the surface thereof. Therefore, the substrate is suitable for the metal bipolar plates for the fuel cell.

Further, it is also possible to form the grooves by performing plastic forming such as press working on the substrate on which the electron conductive and corrosion-resistant material obtained after the adhesion step and the heating step is formed.

It is preferable that the diameter of the boron nitride powder is in the range of 0.05 to 100 μm.

If the diameter of the boron nitride powder is less than 0.05 μm, there is a danger that the manufacturing cost of the powder is increased. Meanwhile, if the diameter of the boron nitride powder is larger than 100 μm, there is a danger that it is difficult to make the boron nitride powder uniformly adhere to the surface of the substrate. For this reason, there is a danger that it is difficult to form the film of the electron conductive and corrosion-resistant material having a uniform thickness on the substrate.

The diameter of the boron nitride powder can be measured by the observation using, for example, a scanning electron microscope.

Further, it is preferable that the adhesion step include an application step of applying boron nitride dispersion liquid, where the boron nitride powder is dispersed in a solvent, on the surface of the substrate; and a drying step of making the boron nitride powder adhere to the substrate by drying the substrate after the application step.

In this case, it is possible to make the boron nitride powder simply adhere to the substrate.

An organic solvent, which does not transmute the boron nitride powder and can be easily gasified in the drying step, may be used as the solvent. For example, a spraying method using a spray or the like may be used as an application method in the application step. Besides, an application method using a brush or the like, a printing method, and a method of dipping the substrate in the boron nitride dispersion liquid may be used as the application method.

Further, the adhesion step may be performed by an electrostatic application without using a solvent.

That is, the boron nitride powder is charged with positive or negative static electricity, and the substrate is charged with static electricity of which electrical polarity is opposite to that of the boron nitride powder. Further, for example, it is possible to disperse the boron nitride powder in the air flow, and to make the dispersed boron nitride powder adhere to the surface of the substrate by an electrostatic force.

Furthermore, it is possible to dry the substrate, for example, by heating the substrate up to the temperature where the solvent is evaporated in the drying step. The heating temperature for the drying may be appropriately determined according to the kind of the solvent.

Meanwhile, according to the second aspect of the present invention, the heating step may be performed subsequent to the application step without performing the drying step.

Next, in the heating step, the substrate on which the adhesion step has been performed is heated at a temperature of 500 to 1650° C. under a non-oxidizing gas atmosphere or in a vacuum. Therefore, it is possible to form the film of the electron conductive and corrosion-resistant material on the substrate.

If the heating temperature is lower than 500° C., there is a danger that the electron conductive and corrosion-resistant material is insufficiently formed or almost disappears. Further, there is a danger that the adhesion property between the substrate and the film made of the electron conductive and corrosion-resistant material becomes insufficient in this case. Meanwhile, if the heating temperature is higher than 1650° C., the heating temperature is near the melting point (about 1670° C.) of titanium. For this reason, there is a danger that the surface of the substrate or the entire substrate is deformed. The upper limit of the heating temperature depends on the material used for the substrate, and may be determined at a temperature lower than the melting point thereof.

In addition, it is preferable that heating temperature in the heating step is in the range of 700 to 1100° C.

In this case, it is possible to ensure a sufficient amount of the formed electron conductive and corrosion-resistant material in a short time, and to keep the deformation of the substrate to a minimum. Accordingly, it is possible to suppress the increase of manufacturing cost. If the heating temperature is lower than 700° C., there is a danger that the heating time required for a sufficient amount of the conductive corrosion-resistant material is increased and manufacturing cost is increased. Meanwhile, if the heating temperature is higher than 1100° C., there is a danger that a liquid phase would be generated depending on the substrate to be used and the substrate is deformed. The upper limit of the heating temperature depends on the material used for the substrate, and may be determined at a temperature lower than the melting point thereof. It is more preferable that the heating temperature in the heating step be in the range of 800 to 1000° C. that can be industrially easily set.

Further, in the manufacturing method according to the second aspect of the present invention, it is preferable to perform a nitriding step of heating the substrate, on which the heating step has been performed, under an inert gas atmosphere including nitrogen gas or ammonia gas.

Furthermore, it is preferable that the substrate heated by the heating step be heated in a nitrogen gas stream.

In these cases, it is possible to add more N elements by the gas nitriding in the nitriding step. Accordingly, it is possible to improve the chemical stability of the electron conductive and corrosion-resistant material, and to further improve corrosion resistance thereof. Furthermore, if nitrogen gas is used, the gas is easily handled. Therefore, it is possible to more simply perform nitriding.

In addition, it is preferable that heating temperature in the nitriding step is in the range of 700 to 1100° C.

If the heating temperature is lower than 700° C., it is not possible to add N elements sufficiently in a short time. Therefore, there is a danger that processing time is increased and manufacturing cost is thus increased. Meanwhile, if the heating temperature is higher than 1100° C., there is a danger that a liquid phase would be generated depending on the substrate to be used and the substrate is thus highly deformed. The upper limit of the heating temperature depends on the material used for the substrate, and may be determined at a temperature lower than the melting point thereof. It is more preferable that the heating temperature in the nitriding step be in the range of 800 to 1000° C. that can be industrially avairable.

It is preferable that the electron conductive and corrosion-resistant material formed on the substrate is used as a metal bipolar plate for a fuel cell together with the substrate.

In this case, it is possible to sufficiently provide the characteristics of the substrate including the electron conductive and corrosion-resistant material, which has excellent electron conductivity and corrosion resistance and is formed on the surface of the substrate.

Next, a preferred embodiment of a third aspect of the present invention will be described.

In the manufacturing method, the boriding step and the nitriding step are performed to manufacture the electron conductive and corrosion-resistant material.

First, in the boriding step, the surface of a substrate of which at least the surface is made of titanium or a titanium alloy is borided. Accordingly, a Ti-boride layer made of, for example, $TiB_2$ and/or $TiB$ is formed on the substrate.

Specifically, a substrate, which is made of, for example, titanium, a titanium alloy, or a Ti—SUS (stainless steel) clad material, may be used as the substrate. Further, a substrate where titanium or a titanium alloy is coated on the surface of a plate made of metal, such as stainless steel or aluminum, may be used as the substrate.

Furthermore, like the second aspect of the present invention, a substrate, which includes grooves used as passages for hydrogen, oxygen, and air on the surface thereof, may be used as the substrate. In this case, it is possible to form the electron conductive and corrosion-resistant material on the substrate including the grooves by performing the boriding step and the nitriding step. Since the substrate on which the electron conductive and corrosion-resistant material obtained as described above is formed includes the grooves used as passages for hydrogen, oxygen, and air on the surface thereof, the substrate is suitable for the metal bipolar plates for the fuel cell. Further, it is also possible to form the grooves by performing plastic forming such as press working on the substrate on the electron conductive and corrosion-resistant material obtained after the boriding step and the nitriding step is formed.

In the boriding step, it is preferable to perform a molten salt electrolyzing method using boric-acid-based molten salt is performed in the boriding step.

In this case, it is possible to simply and quickly boride the surface of the substrate. Furthermore, it is possible to uniformly form the Ti-boride layer. In addition, in the molten salt electrolyzing method, it is possible to perform boriding without using boron compounds such as diborane that is not easily handled due to volatility. Therefore, it is possible to safely perform the boriding step.

In the molten salt electrolyzing method, specifically, it is possible to boride the surface of the substrate by dipping the substrate, for example, in a boric-acide-based molten salt bath and performing electrolyzation in the bath while using the substrate as an electrode. For example, $B_2O_3$, borax, boron carbide, and the like may be used as the boric-acid-based molten salt.

Further, mixed molten salt, where the boric-acid-based molten salt and alkali metal oxide, such as $Li_2O$, $Na_2O$, or $K_2O$ are mixed to each other, may be used in the molten salt electrolyzing method. In this case, it is possible to decrease viscosity of the boric-acid-based molten salt. Furthermore, if the alkali metal oxide is used, it is possible to decrease viscosity as described above and to make boron react to the substrate prior to alkali metal by controlling electrolysis conditions. Accordingly, it is possible to form a Ti-boride layer that hardly contains impurities in the boriding step.

In the nitriding step, it is preferable that the substrate on which the Ti-boride layer is formed be heated under the inert gas atmosphere including nitrogen gas or ammonia gas.

In addition, in the nitriding step, it is preferable that the substrate on which the Ti-boride layer is formed be heated in a nitrogen gas stream.

In these cases, it is possible to nitride the Ti-boride layer. Furthermore, if nitrogen gas is used, the gas is easily handled. Therefore, it is possible to more simply perform nitriding.

Next, in the nitriding step, it is preferable that the substrate on which the Ti-boride layer is formed is heated at a temperature of 700 to 1100° C. in the nitriding step.

If the heating temperature is lower than 700° C., there is a danger that it is difficult to perform nitriding and the electron conductive and corrosion-resistant material is insufficiently formed. Meanwhile, if the heating temperature is higher than 1100° C., there is a danger that a liquid phase would be generated depending on the material of the substrate to be used and the surface of the substrate or the entire substrate is deformed. The upper limit of the heating temperature depends on the material used for the substrate, and may be determined at a temperature lower than the melting point. It is more preferable that the heating temperature in the nitriding step be in the range of 800 to 1000° C. is industrially avairable.

It is preferable that at least the surface of the substrate be made of a titanium alloy containing 3A or 3B and 5A or 5B group elements of the periodic table.

In this case, Ti of the film of the electron conductive and corrosion-resistant material, which is formed by performing the boriding step and the nitriding step, is apt to approach a stable quadrivalent element. For this reason, it is possible to improve corrosion resistance while maintaining electron conductivity.

Further, it is preferable that the electron conductive and corrosion-resistant material formed on the substrate is used as a metal bipolar plate for the fuel cell together with the substrate.

In this case, it is possible to sufficiently exhibit the characteristics of the substrate including the electron conductive and corrosion-resistant material, which has excellent electron conductivity and corrosion resistance and is formed on the surface of the substrate.

Next, a preferred embodiment of a fourth aspect of the present invention will be described.

In the manufacturing method according to a fourth aspect of the present invention, the thermal spraying step and the nitriding step are performed to manufacture the electron conductive and corrosion-resistant material.

First, in the thermal spraying step, $TiB_2$ powder is sprayed onto at least a part of the surface of the metal substrate. Accordingly, a $TiB_2$ layer formed of $TiB_2$ particles is formed on the metal substrate.

Specifically, various kinds of metal substrates, which are made of, for example, titanium, a titanium alloy, a Ti—SUS (stainless steel) clad material, stainless steel, aluminum, an aluminum alloy, and the like, may be used as the metal substrate.

Further, like the second and third aspects of the present invention, a substrate, which includes grooves used as passages for hydrogen, oxygen, and air on the surface thereof, may be used as the metal substrate. In this case, it is possible to form the electron conductive and corrosion-resistant material on the metal substrate including the grooves by performing the thermal spraying step and the nitriding step. Since the metal substrate on which the electron conductive and corrosion-resistant material obtained as described above is formed includes the grooves used as passages for hydrogen, oxygen, and air on the surface thereof, the metal substrate is more suitable for the metal bipolar plates for the fuel cell. Furthermore, it is also possible to form the grooves by performing plastic forming such as press working on the substrate on which the electron conductive and corrosion-resistant material obtained after the thermal spraying step and the nitriding step is formed.

Various methods, which have been known when the application of the present invention was filed, may be employed as the spraying method in the thermal spraying step. Specifically, it is possible to spray the $TiB_2$ powder on the metal substrate by, for example, plasma spraying.

In the nitriding step, it is preferable that the metal substrate on which the $TiB_2$ layer is formed is heated under an inert gas atmosphere including nitrogen gas or ammonia gas in the nitriding step.

Further, in the nitriding step, it is preferable that the metal substrate on which the $TiB_2$ layer is formed is heated in a nitrogen gas stream in the nitriding step.

In these cases, it is possible to simply nitride the $TiB_2$ layer. Furthermore, it is possible to obtain an advantage of improving productivity by continuously performing nitriding. Further, if nitrogen gas is used, the gas is easily handled. Therefore, it is possible to more simply perform nitriding.

Next, in the nitriding step, it is preferable that the metal substrate on which the $TiB_2$ layer is formed is heated at a temperature of 700 to 1100° C. in the nitriding step.

If the heating temperature is lower than 700° C., there is a danger that it is difficult to perform nitriding and the electron conductive and corrosion-resistant material is insufficiently formed. Meanwhile, if the heating temperature is higher than 1100° C., there is a danger that the state of the metal substrate is changed into a liquid phase according to the element contained in the metal substrate and the metal substrate is thus highly deformed. The upper limit of the heating temperature depends on the material used for the substrate, and may be determined at a temperature lower than the melting point thereof. It is more preferable that the heating temperature be in the range of 800 to 1000° C. that can be industrially easily set.

Further, it is preferable that the electron conductive and corrosion-resistant material formed on the metal substrate is used as a metal bipolar plate for a fuel cell together with the metal substrate.

In this case, it is possible to sufficiently exhibit the characteristics of the metal substrate including the electron conductive and corrosion-resistant material, which has excellent electron conductivity and corrosion resistance and is formed on the surface of the substrate.

The electron conductive and corrosion-resistant material according to the first aspect of the present invention, and the electron conductive and corrosion-resistant materials obtained by the manufacturing methods according to the second to fourth aspects may be used as not only the metal bipolar plates for the fuel cell but also other instrument.

EXAMPLES

Example 1

An example of the present invention will be described below with reference to FIGS. 2 to 14.

This example is an example where an electron conductive and corrosion-resistant material formed on a substrate is manufactured. That is, the substrate on which the film of the electron conductive and corrosion-resistant material is formed in the surface is manufactured, and corrosion resistance and electron conductivity thereof are evaluated. The substrate on which the electron conductive and corrosion-resistant material to be manufactured in this example is formed is used as a metal bipolar plate for a fuel cell. In general, grooves used as passages for oxygen gas (air) or hydrogen gas are formed on the surfaces of the metal bipolar plates (see FIG. 1). However, in this example, for convenience in evaluating corrosion resistance and electron conductivity, the electron conductive and corrosion-resistant material 3 is manufactured on a plate-like substrate 2 on which grooves are not formed as shown in FIG. 4.

The electron conductive and corrosion-resistant material 3 comprises titanium, boron, and nitrogen. If X-ray diffraction (XRD) measurement is performed by a Cu—Kα ray, the electron conductive and corrosion-resistant material shows peaks at least when 2θ is 29.1±0.1°, 41.7±0.1°, and 42.2±0.1°, and does not show peaks when 2θ is 46.4±0.1° and 48.9±0.1°.

A method of manufacturing the electron conductive and corrosion-resistant material will be described below.

Figure 4:
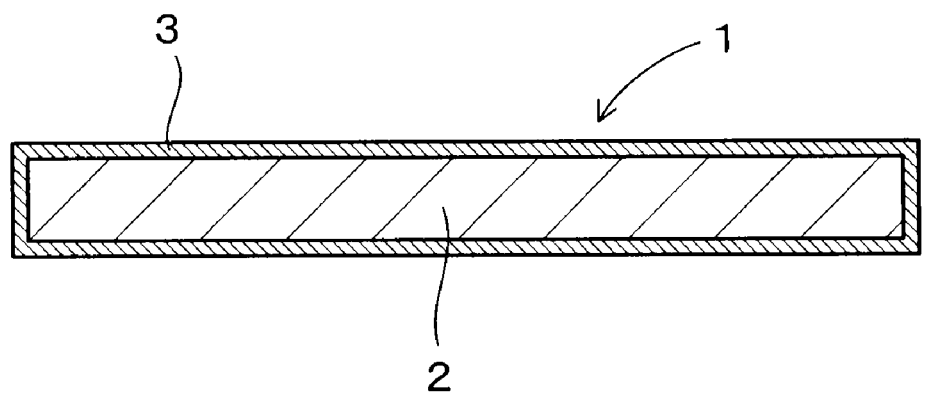
FIG. 4 is a cross-sectional view of the substrate including a film of an electron conductive and corrosion-resistant material formed on the surface thereof according to Example 1.

In this example, an adhesion step and a heating step are performed to form the film of the electron conductive and corrosion-resistant material 3 on the surface of the substrate 2 as shown in FIG. 4.

Figure 2:
FIG. 2 is a cross-sectional view of a substrate according to Example 1.
Figure 3:
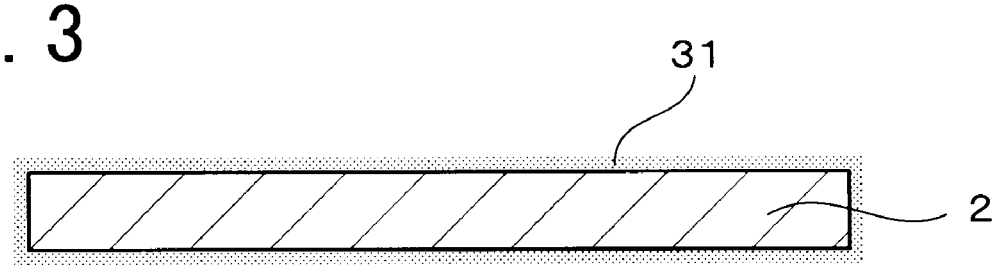
FIG. 3 is a cross-sectional view of the substrate including boron nitride powder adhering to the surface thereof according to Example 1.

In the adhesion step, boron nitride powder 31 adheres to the surface of the substrate 2 (see FIGS. 2 and 3). Further, in the heating step, the substrate 2 to which the boron nitride powder 31 has adhered is heated at a temperature of 500 to 1650° C. under a non-oxidizing gas atmosphere or in a vacuum. Therefore, it is possible to form the film of the electron conductive and corrosion-resistant material 3 on the substrate 2 (see FIG. 4).

Furthermore, an application step and a drying step are performed in the adhesion step of this example. In the application step, boron nitride dispersion liquid where the boron nitride powder is dipped in a solvent is applied to the surface of the substrate. In the drying step, the substrate to which the boron nitride dispersion liquid is applied is dried, so that the boron nitride powder adheres to the substrate.

A method of manufacturing the electron conductive and corrosion-resistant material of this example will be described in detail below.

First, a titanium sheet 2 was prepared (see FIG. 2).

Further, there was prepared a mixed solvent where boron nitride powder having average grain diameter of 10 μm, 60 wt % of n-hexane, and 40 wt % of isopropanol (IPA) were mixed to one another.

The boron nitride dispersion liquid was manufactured by adding 20 parts by weight of the boron nitride powder to 80 parts by weight of the mixed solvent. The boron nitride dispersion liquid was applied to the surface of the substrate 2 by spraying (application step). After that, the boron nitride powder 31 adhered to the surface of the substrate 2 as shown in FIG. 3 by drying the substrate in a thermostatic chamber having temperature of 80° C. (drying step). The substrate 2 to which the boron nitride powder 31 adhered is referred to as Sample C1.

Subsequently, Sample C1 was heated at a temperature of 1000° C. in a high-purity Ar gas stream for two hours (heating step). Then, Sample C1 was washed, so that the substrate 2 on which the film of the electron conductive and corrosion-resistant material 3 (metal bipolar plates 1 for a fuel cell) was formed was obtained as shown in FIG. 4. This is referred to as Sample E1.

Further, the heating temperature and heating time of the heating step were changed and others were set to the same conditions as those of Sample E1 in this example, so that substrates on which another three kinds of electron conductive and corrosion-resistant materials were formed (Samples E2 to E4) were manufactured.

Specifically, Sample E2 was manufactured by heating the substrate to which the boron nitride powder adhered (Sample C1) in the heating step at a temperature of 1000° C. for 20 minutes.

Sample E3 was manufactured by heating the substrate to which the boron nitride powder adhered (Sample C1) in the heating step at a temperature of 900° C. for 20 minutes. Sample E4 was manufactured by heating the substrate to which the boron nitride powder adhered (Sample C1) in the heating step at a temperature of 850° C. for 20 minutes.

Figure 5:
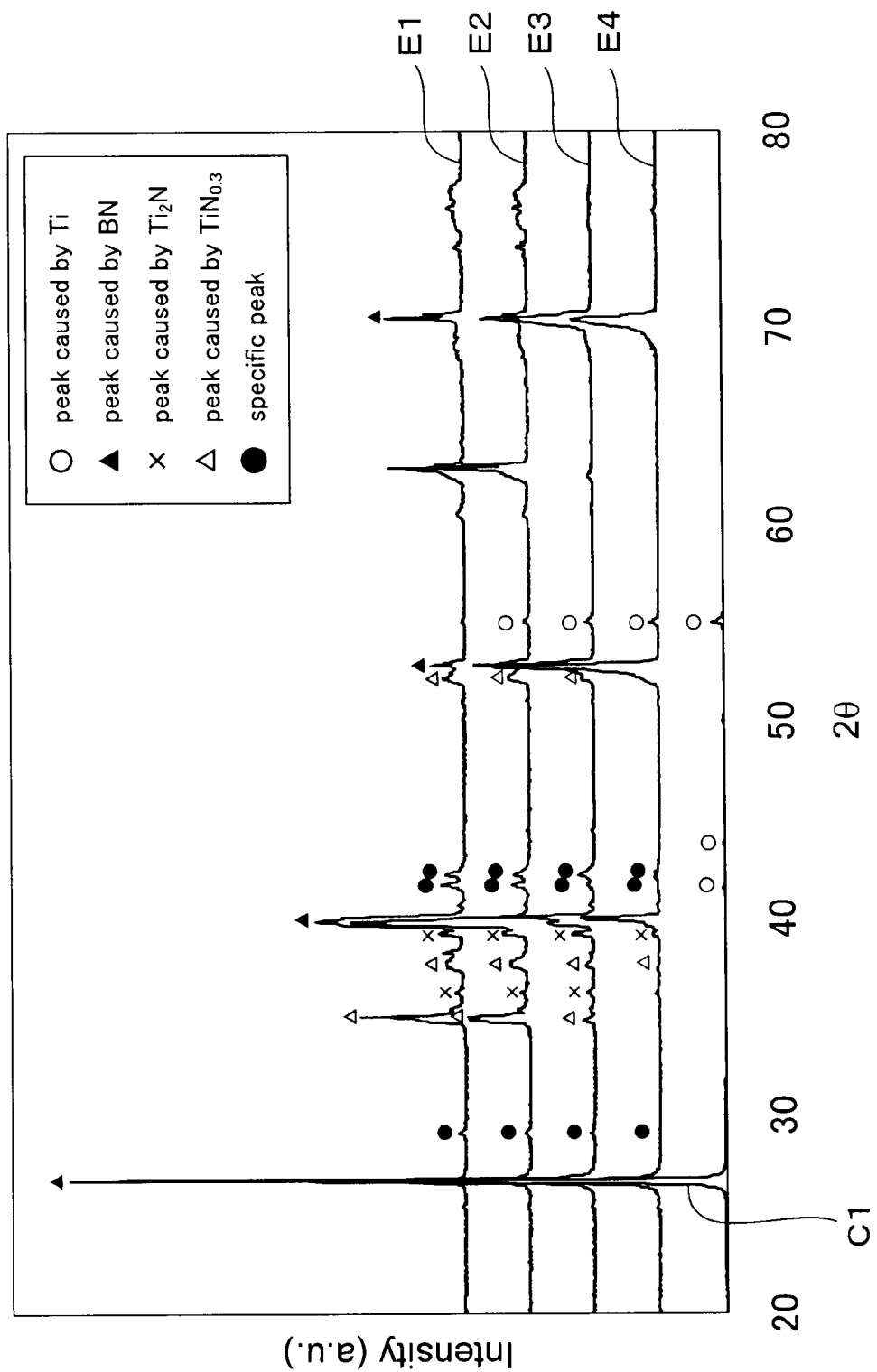
FIG. 5 is a diagram showing XRD patterns on the surfaces of five kinds of substrates (Samples E1 to E4 and Sample C1) according to Example 1.
Figure 6:
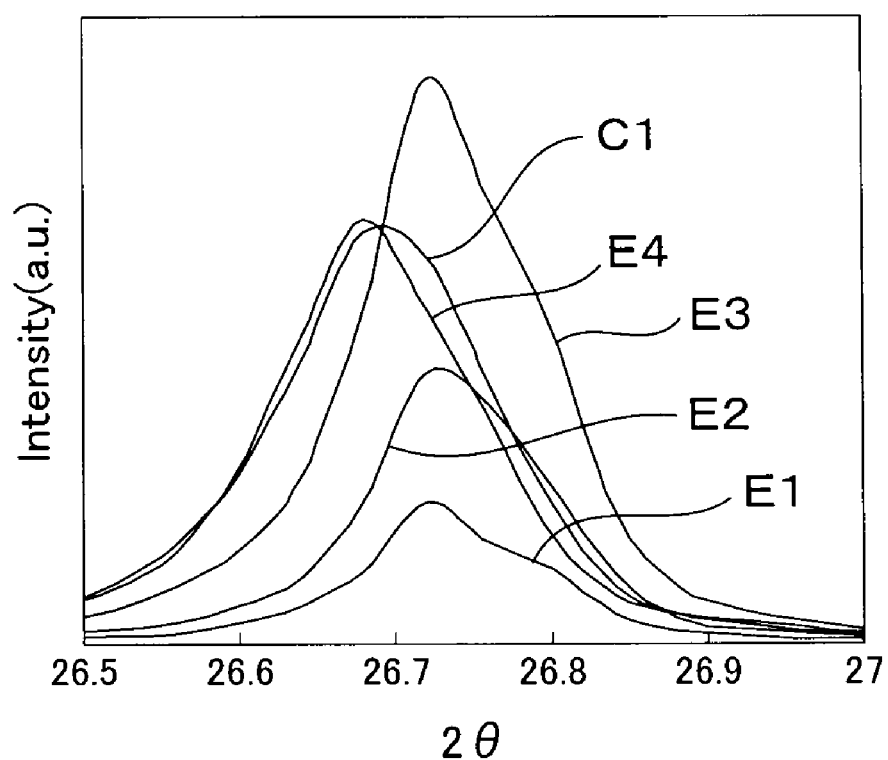
FIG. 6 is a diagram showing portions that correspond to a diffraction angle in the range of 26.5 to 27° in FIG. 5, and is a diagram where the peak intensity of Sample C1 is represented by 1/100.
Figure 7:
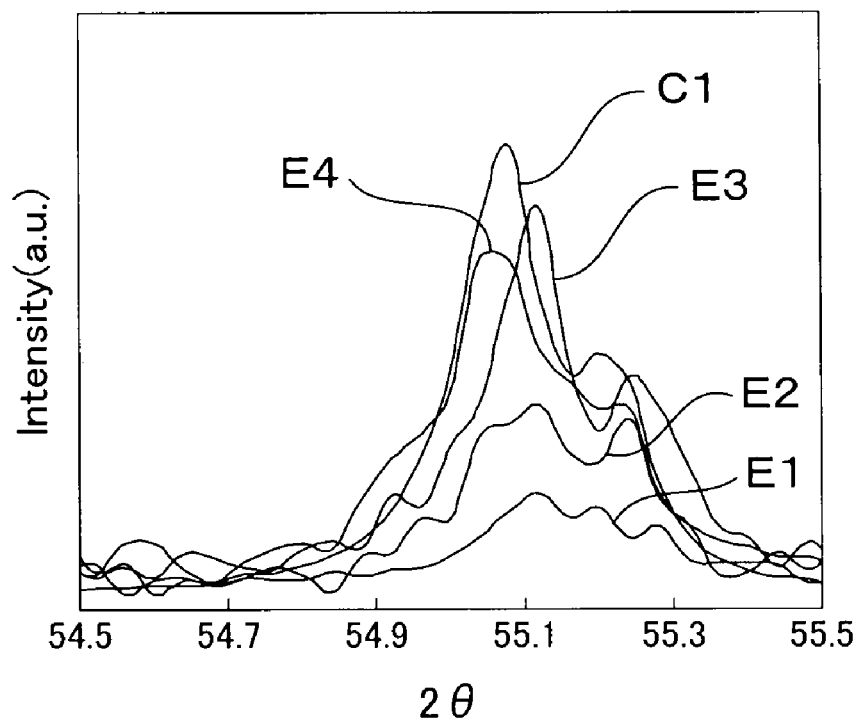
FIG. 7 is a diagram showing portions that correspond to a diffraction angle in the range of 54.5 to 55.5° in FIG. 5, and is a diagram where the peak intensity of Sample C1 is represented by 1/40.

Subsequently, an X-ray was irradiated to the electron conductive and corrosion-resistant material formed on the surface of each of Samples E1 to E4 so as to measure the X-ray diffraction pattern. The measurement was performed in the atmosphere using Rint-1500 manufactured by Rigaku Denki Co., Ltd. as a measuring apparatus. The results of the measurement are shown in FIGS. 5 to 7. Further, for the purpose of the comparison with Samples E1 to E4, the same XRD measurement was also performed on Sample C1. The results thereof are shown in FIGS. 5 to 7.

As shown in FIG. 5, as for Samples E1 to E4, it is understood that peaks caused by h-BN, $Ti_2N$, $TiN_{0.3}$, and Ti are confirmed and films made of the electron conductive and corrosion-resistant material containing h-BN, $Ti_2N$, $TiN_{0.3}$, and Ti are formed. In contrast, as for Sample C1, a peak caused by BN is confirmed but peaks caused by TiB and $TiN_{0.3}$ are not confirmed. Further, as shown in FIGS. 6 and 7, each of Samples E1 to E4 has hexagonal crystal boron nitride structure like Sample C1, but a peak of the (002) plane shifted as compared to Sample C1.

Furthermore, as shown in FIG. 5, Samples E1 to E4 show peaks when 2θ is 29.1±0.1°, 41.7±0.1°, and 42.2±0.1°. These peaks are specific peaks to the electron conductive and corrosion-resistant material according to the present invention. The peak pattern of the XRD diffraction is similar to the pattern of TiB, but peaks are not shown when 2θ is 46.4±0.1° and 48.9±0.1°. Therefore, it is thought that the materials of Samples E1 to E4 are different from TiB.

Subsequently, a corrosion test was performed on substrates on which three kinds of electron conductive and corrosion-resistant materials manufactured at different heating temperature were formed (Samples E2, E3, and E4), in order to compare corrosion resistance of these materials.

(Corrosion Test)

Figure 8:
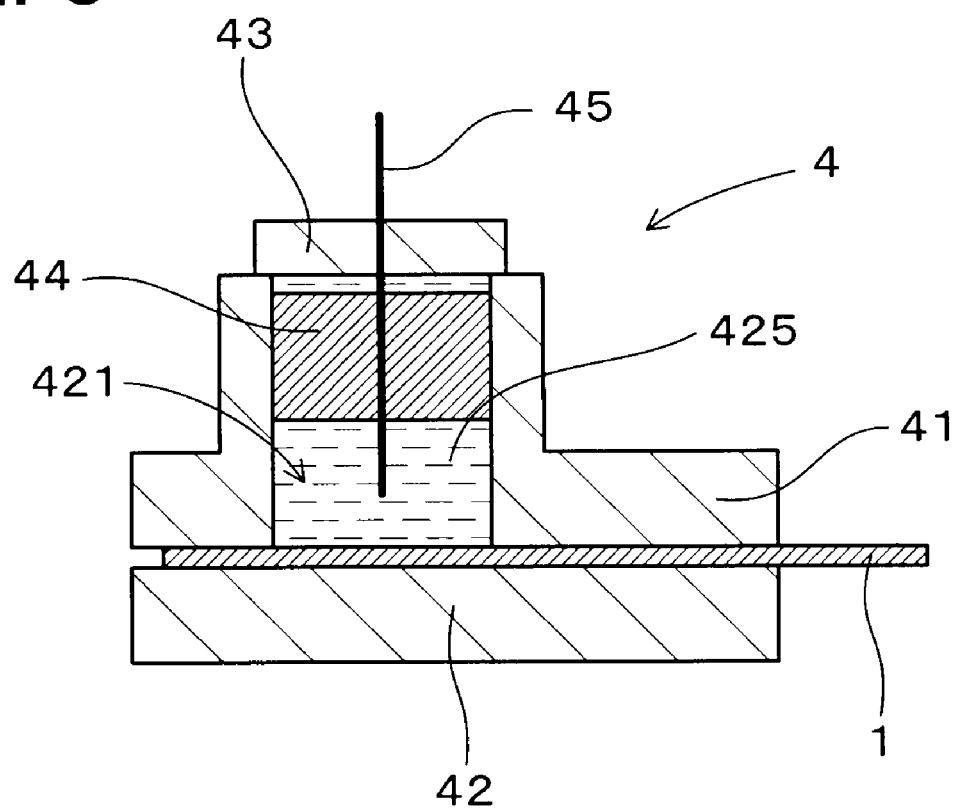
FIG. 8 is a cross-sectional view of a corrosion current measuring apparatus according to Example 1.
Figure 9:
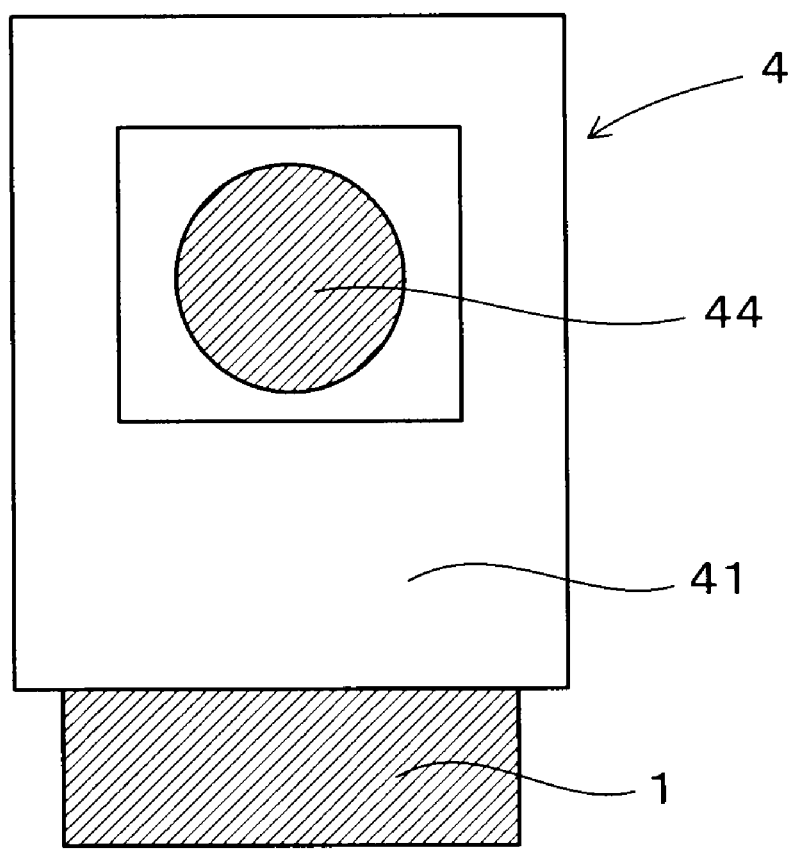
FIG. 9 is a view showing the corrosion current measuring apparatus in a state that a lid is removed therefrom when seen from the top according to Example 1.

The corrosion test for each of measurement samples (Samples E2, E3, and E4) was performed by a corrosion current measuring apparatus 4 shown in FIGS. 8 and 9.

As shown in FIGS. 8 and 9, the corrosion current measuring apparatus 4 includes a first body 41 and a second body 42. Each measurement sample 1 is interposed between the first and second bodies 41 and 42. The first body 41 has a substantially convex cross-section, and includes a cylindrical cavity 421 (inner diameter: 34 mm, length: 30 mm) that passes through the first body from an upper end of a protruding portion to a lower end of the first body. Further, a lid 43 is provided at an upper end of the cavity 421.

First, in the corrosion test, each measurement sample 1 was interposed between the first and second bodies 41 and 42. Accordingly, a cup-shaped measurement cell 425 was formed by an inner wall of the cavity 421 of the first body 41 and the measurement sample 1. Subsequently, the lid 43 was opened, an electrolyte was supplied into the measurement cell 425, and a rod-shaped platinum reference electrode 45 and a disk-shaped platinum counter electrode 44 were disposed in the electrolyte. The measurement sample, the platinum reference electrode, and the platinum counter electrode were connected to a Potentio/Galvano stat (HA-151) manufactured by Hokuto Denko Corporation. Meanwhile, the electrolyte was made by adding 10 ppm of $Cl^-$ and 5 ppm of $F^-$ to a dilute sulfuric acid (pH4).

Figure 10:
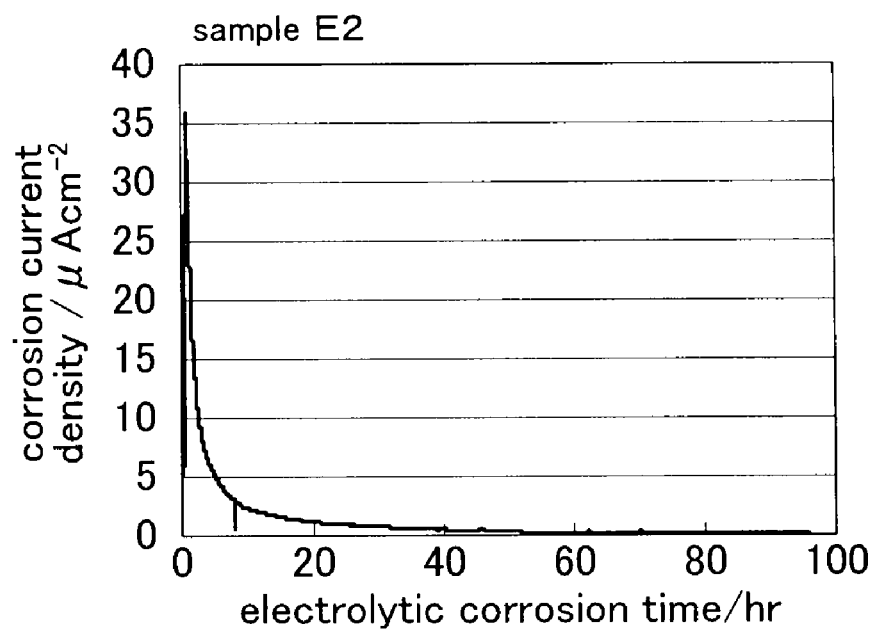
FIG. 10 is a view showing a relationship between corrosion time and corrosion current density of the substrate (Sample E2) on which an electron conductive and corrosion-resistant material is formed according to Example 1.
Figure 11:
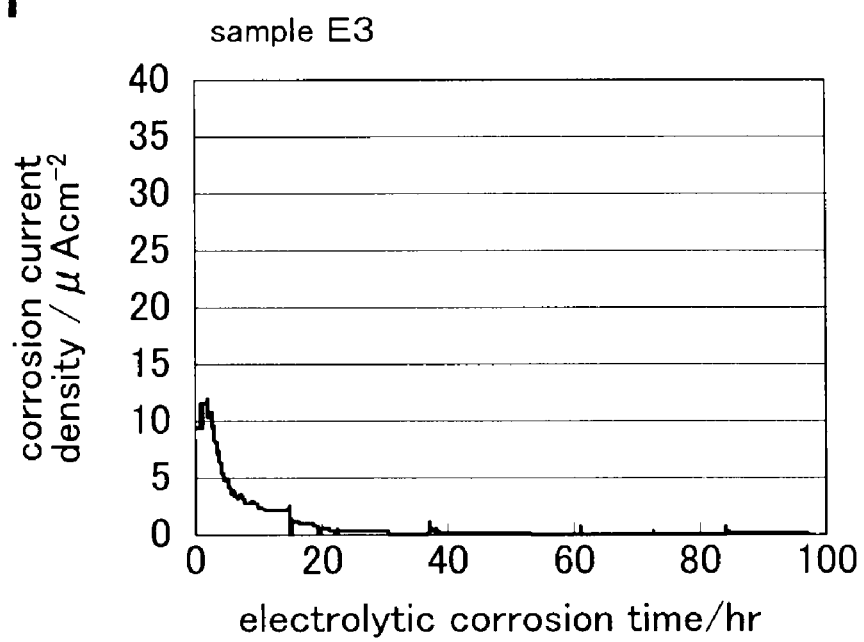
FIG. 11 is a view showing a relationship between corrosion time and corrosion current density of the substrate (Sample E3) on which an electron conductive and corrosion-resistant material is formed according to Example 1.
Figure 12:
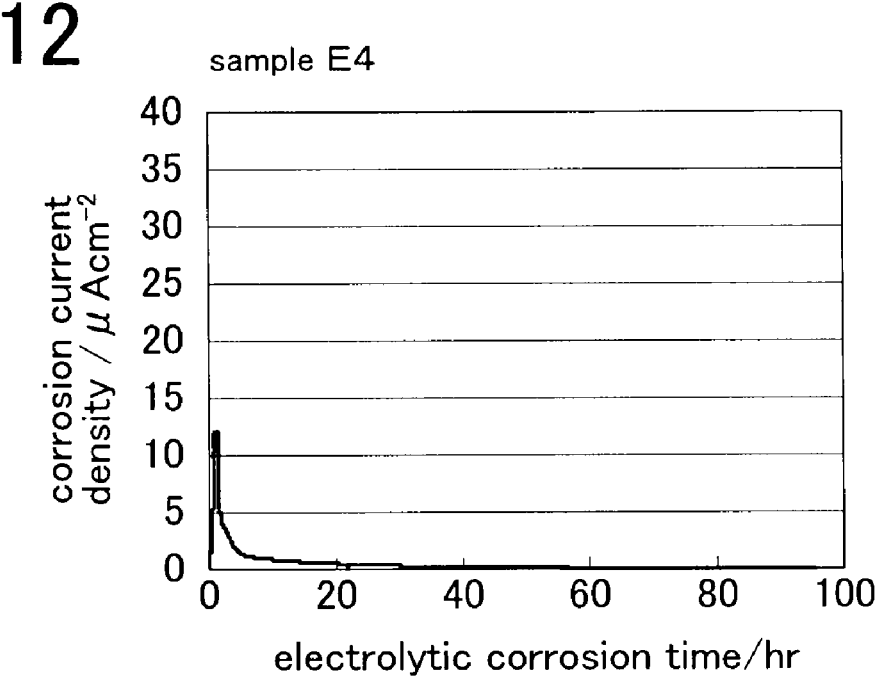
FIG. 12 is a view showing a relationship between corrosion time and corrosion current density of the substrate (Sample E4) on which an electron conductive and corrosion-resistant material is formed according to Example 1.

Then, the temperature of the electrolyte was adjusted at 80° C. by constant-temperature means (not shown), and a voltage was applied to the measurement sample by the Potentio/Galvano stat so that the potential difference between the reference electrode 43 and the measurement sample 1 became 0.26 V. Further, until 100 hours had passed after a voltage started to be applied, current (corrosion current) was measured. Corrosion current density ($\mu Acm^{-2}$) was calculated by dividing a value of the obtained corrosion current by a contact area between the measurement sample and the electrolyte. A relationship between voltage application time (corrosion time) and corrosion current density is shown in FIGS. 10 to 12. Meanwhile, FIG. 10 shows the result of Sample E2, FIG. 11 shows the result of Sample E3, and FIG. 12 shows the result of Sample E4.

As shown in FIGS. 10 to 12, as for Samples E2, E3, and E4, the corrosion current density was rapidly decreased in an initial stage of the corrosion test and became constant at about 0.05 µAcm$^{-2}$ or less. Accordingly, it is understood that Samples E2, E3, and E4 have excellent corrosion resistance.

After that, a contact-resistance measurement was performed on measurement samples (Samples E2, E3, and E4) before and after the corrosion, in order to measure the variation in electron conductivity thereof.

(Contact-Resistance Measurement Test)

Figure 13:
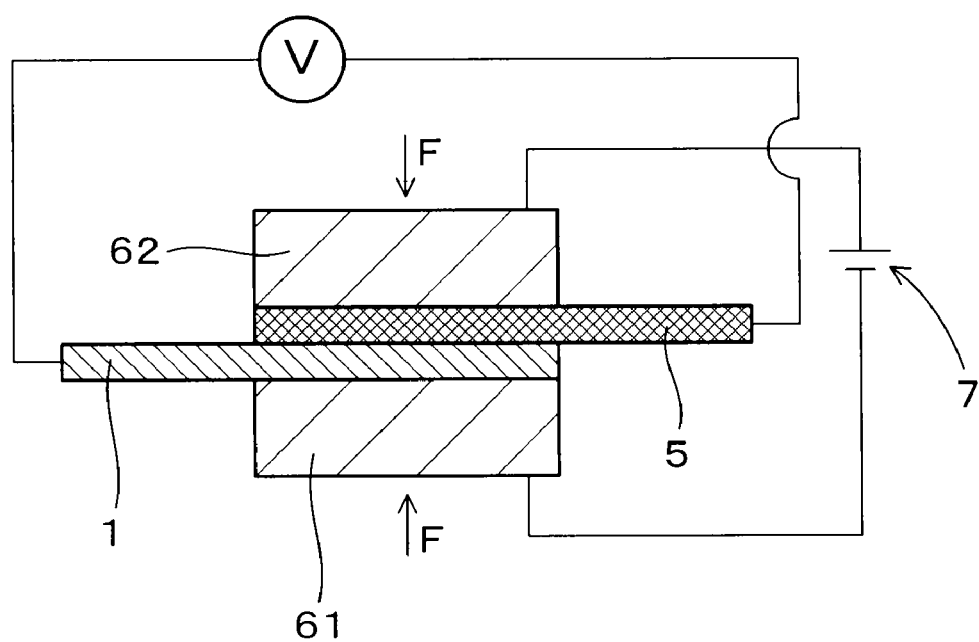
FIG. 13 is a view illustrating a state that contact resistance is measured in Example 1.

First, each measurement sample 1 and carbon paper 5 were interposed between two gold-plated copper plates 61 and 62 while the carbon paper 5 was being laminated on the measurement sample 1 as shown in FIG. 13. Subsequently, a constant current DC power supply 7 made stationary current of 1 A flow between the gold-plated copper plates 61 and 62, and a load F corresponding to air pressure of 1.47 MPa was applied between the two gold-plated copper plates 61 and 62 by a load cell (not shown). Further, when 60 seconds passed after the load F started to be applied, the potential difference V was measured. An electrical resistance value was calculated from the potential difference V, and was referred to as a contact resistance value.

As for Sample E2, contact resistances of a sample on which the corrosion test was not performed, the sample on which the corrosion test was performed for 50 hours, the sample on which the corrosion test was performed for 100 hours, and the sample on which the corrosion test was performed for 200 hours were measured.

As for Samples E3 and E4, contact resistances of the sample on which the corrosion test was not performed, the sample on which the corrosion test was performed for 50 hours, and the sample on which the corrosion test was performed for 100 hours were measured.

Figure 14:
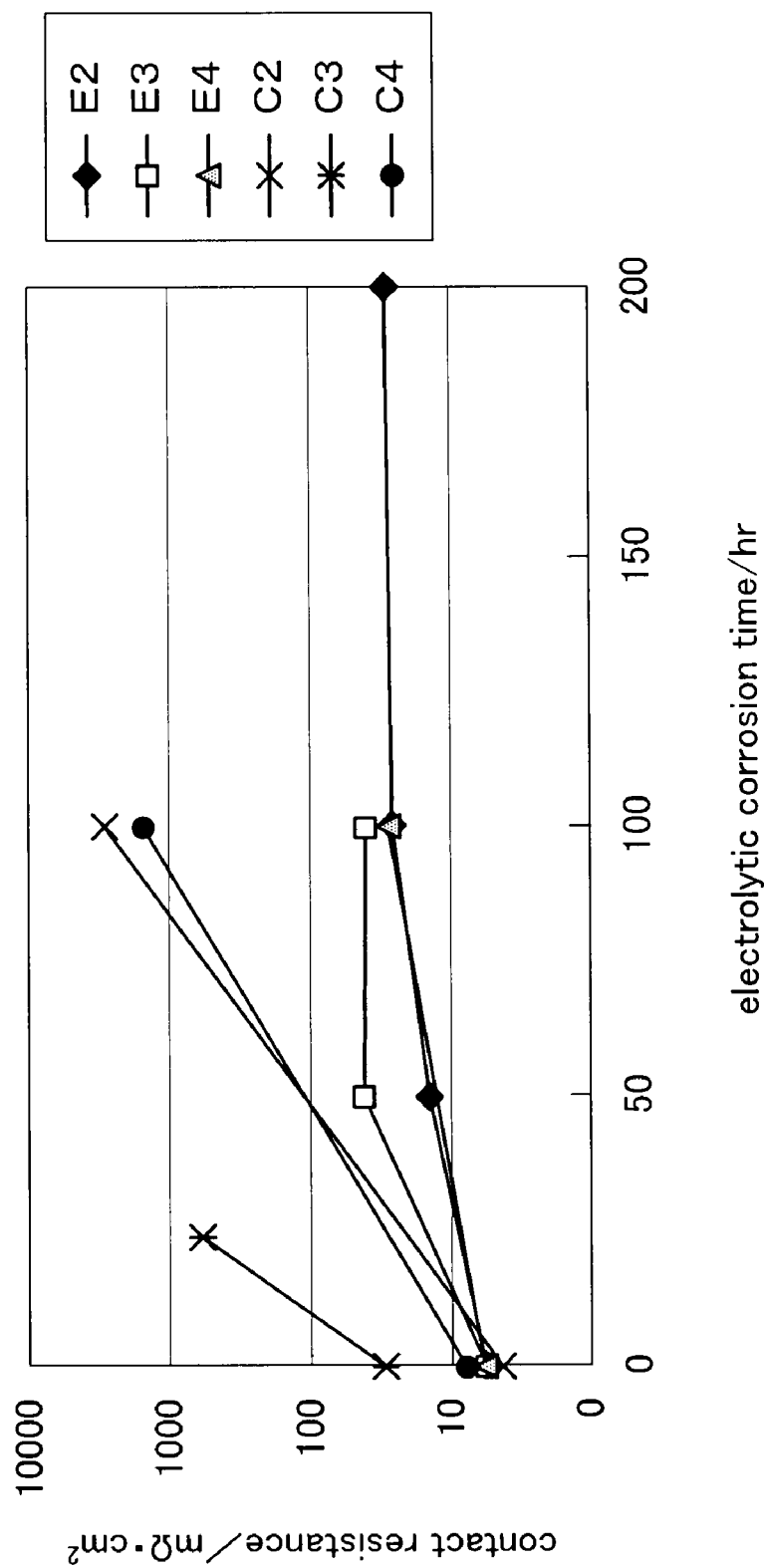
FIG. 14 is a diagram showing a relationship between corrosion time and contact resistances of six kinds of substrates (Samples E2, E3, E4, and C2 to C4) according to Example 1.

The results thereof are shown in FIG. 14.

Further, for the purpose of the comparison with Samples E2, E3, and E4, three kinds of substrates (Samples C2 to C4) were manufactured, and contact resistances of these samples were also measured in the same manner as described above.

Sample C2 was manufactured by heating a Ti plate in the N$_2$ gas stream at a temperature of 800° C. for 2 hours. A TiN layer was formed on the surface of the Ti plate by heating the Ti plate in the N$_2$ gas stream. As a result, there was obtained the substrate including the TiN layer that was made of TiN and formed on the surface of the Ti plate.

As for Sample C2, contact resistance of the sample on which the corrosion test was not performed or the sample on which the corrosion test was performed for 100 hours was measured.

Further, Sample C3 was a substrate composed of a pure Ti plate on which acid washing was not performed and rolling was performed.

As for Sample C3, the contact resistance of the sample on which the corrosion test was not performed or the sample on which the corrosion test was performed for 25 hours was measured.

Furthermore, Sample C4 was manufactured by mixing 90 vol % of Ti powder to 10 vol % of TiB$_2$ powder, forming the mixture in the shape of a plate, and sintering the mixture. As a result, there was obtained a substrate (Sample C4) where 10 vol % of TiB$_2$ was dispersed in the Ti primary ingredient.

As for Sample C4, contact resistance of the sample on which the corrosion test was not performed or a sample on which the corrosion test was performed for 100 hours was measured.

The above-mentioned results (Samples C2 to C4) were shown in FIG. 14.

As shown in FIG. 14, contact resistance of Sample C3 composed of a titanium plate was increased up to a significantly high value of about 800 mΩ·cm$^2$ due to the corrosion test that was performed for a short time of 25 hours. Meanwhile, the increase rates of contact resistances of Sample C2 including a TiN layer on the surface thereof and Sample C4 where TiB$_2$ was dispersed were gentle as compared to Sample C3, but approached 1000 mΩ·cm$^2$ after the corrosion test was performed for 100 hours.

In contrast, even after the corrosion test was performed for 100 hours, Samples E2, E3, and E4 had a significantly low contact resistance value of 100 mΩ·cm$^2$ or less. Further, when the corrosion test was performed for about 100 hours, the increase rates of contact resistances of Samples E2, E3, and E4 were significantly small. It is understood that Samples E2, E3, and E4 have a stable and low contact resistance value.

As described above, Samples E2, E3, and 4 where the film made of the electron conductive and corrosion-resistant material was formed on the surface of the substrate made of titanium had excellent electron conductance and corrosion resistance, and were suitable for the metal bipolar plates for the fuel cell.

Example 2

Like Example 1, this example is an example that forms the film of the electron conductive and corrosion-resistant material on the substrate and measures X-ray diffraction of the electron conductive and corrosion-resistant material.

First, like in Example 1, the electron conductive and corrosion-resistant material was formed on the substrate.

Specifically, first, a Ti plate (JIS first class) having a thickness of 0.6 mm was prepared as the substrate.

After that, like in Example 1, there was prepared a mixed solvent where n-hexane and isopropanol were mixed to each other, and boron nitride dispersion liquid was made by adding 20 parts by weight of boron nitride powder to 80 parts by weight of the mixed solvent. Powder made of boron nitride (h-BN) having hexagonal crystal structure was used as the boron nitride powder. The boron nitride dispersion liquid was applied to the surface of the substrate by spraying (application step), and the substrate was then dried in a thermostatic chamber having temperature of 80° C. for several minutes (drying step). After that, the substrate to which the boron nitride powder adhered was heated in the Ar gas stream at a temperature of 1000° C. for 2 hours (heating step). Subsequently, impurities adhering to the surface of the substrate were removed by washing the substrate with water and acetone. In this way, there was obtained the substrate including the film made of the electron conductive and corrosion-resistant material on the surface thereof. This is referred to as Sample E5.

Further, the heating temperature in the heating step was changed and others were set to the same conditions as those of Sample E5 in this example, so that substrates on which two kinds of electron conductive and corrosion-resistant materials were formed (Samples E6 and E7) were manufactured.

Specifically, Sample E6 was manufactured by heating the substrate to which the boron nitride powder adhered in the heating step at a temperature of 900° C. for 2 hours.

Sample E7 was manufactured by heating the substrate to which the boron nitride powder adhered (Sample C1) in the heating step at a temperature of 800° C. for 2 hours.

After that, an X-ray was irradiated to the electron conductive and corrosion-resistant material formed on the surface of each of Samples E5 to E7 so as to measure the X-ray diffraction pattern. The measurement was performed in the atmosphere at room temperature using Rint-1500 manufactured by Rigaku Denki Co., Ltd. as a measuring apparatus. The results of the measurement are shown in FIGS. 15 to 17.

Figure 15:
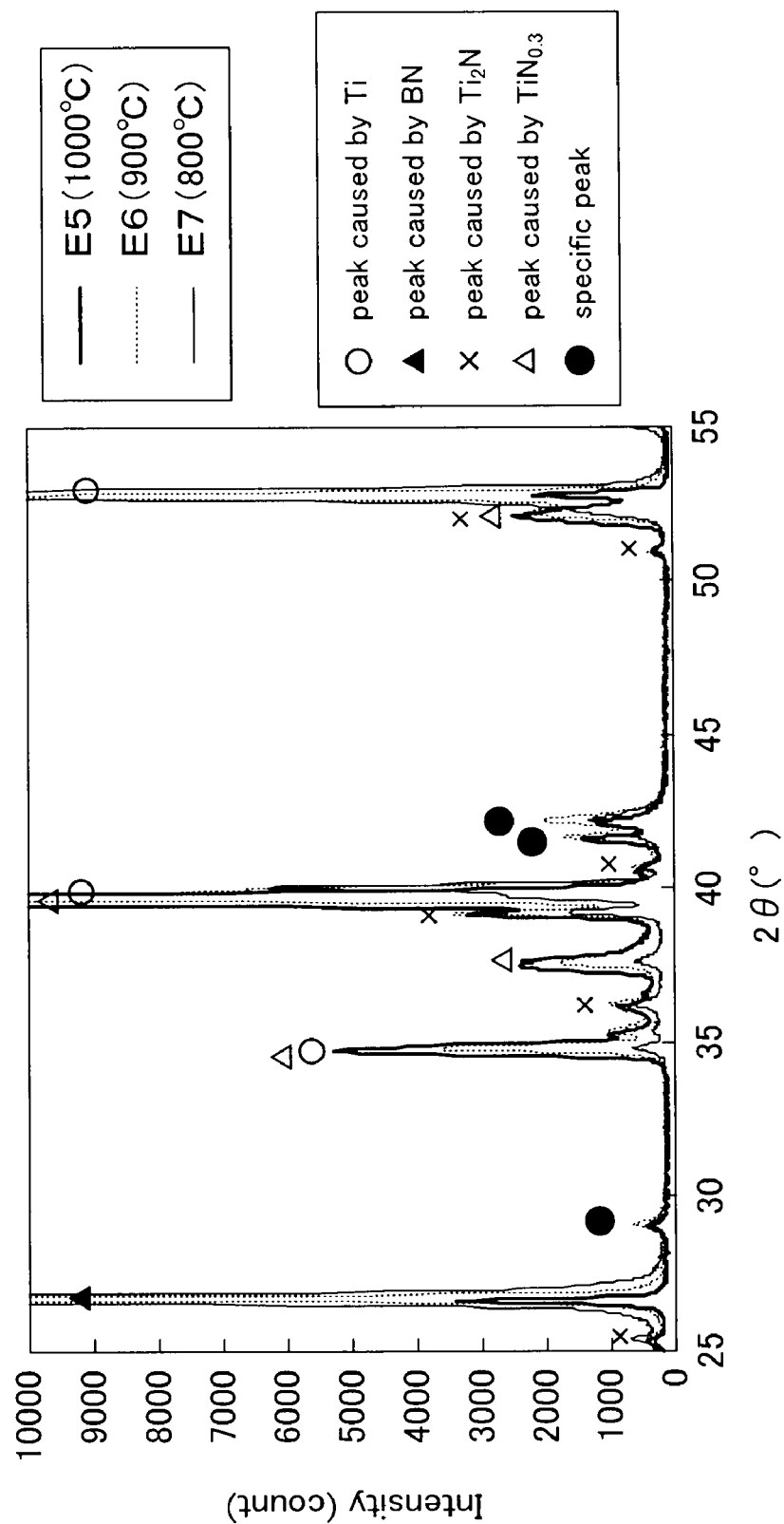
FIG. 15 is a diagram showing XRD patterns of three kinds of electron conductive and corrosion-resistant materials (Samples E5 to E7) formed on a substrate according to Example 2.
Figure 16:
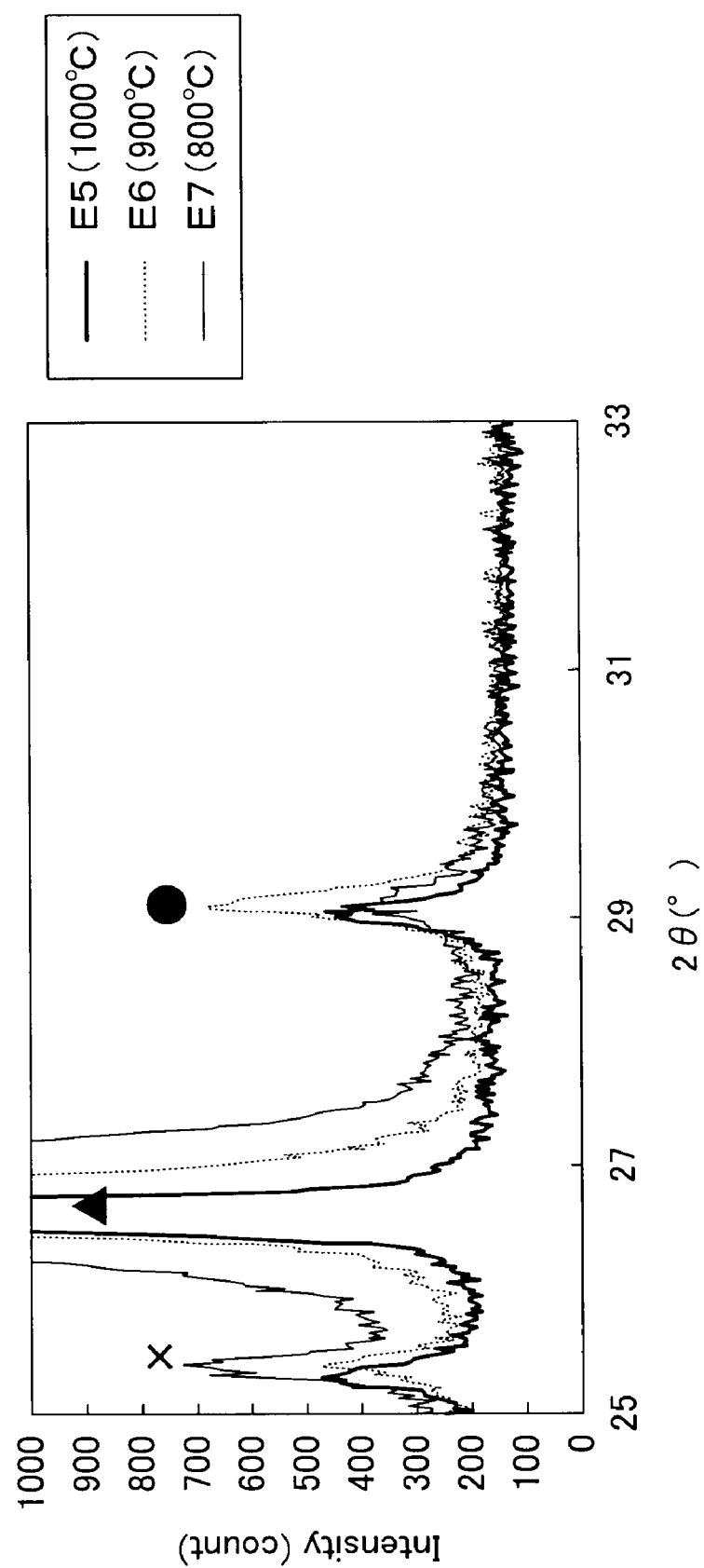
FIG. 16 is an enlarged view of portions that correspond to a diffraction angle in the range of 25 to 33° in FIG. 15.
Figure 17:
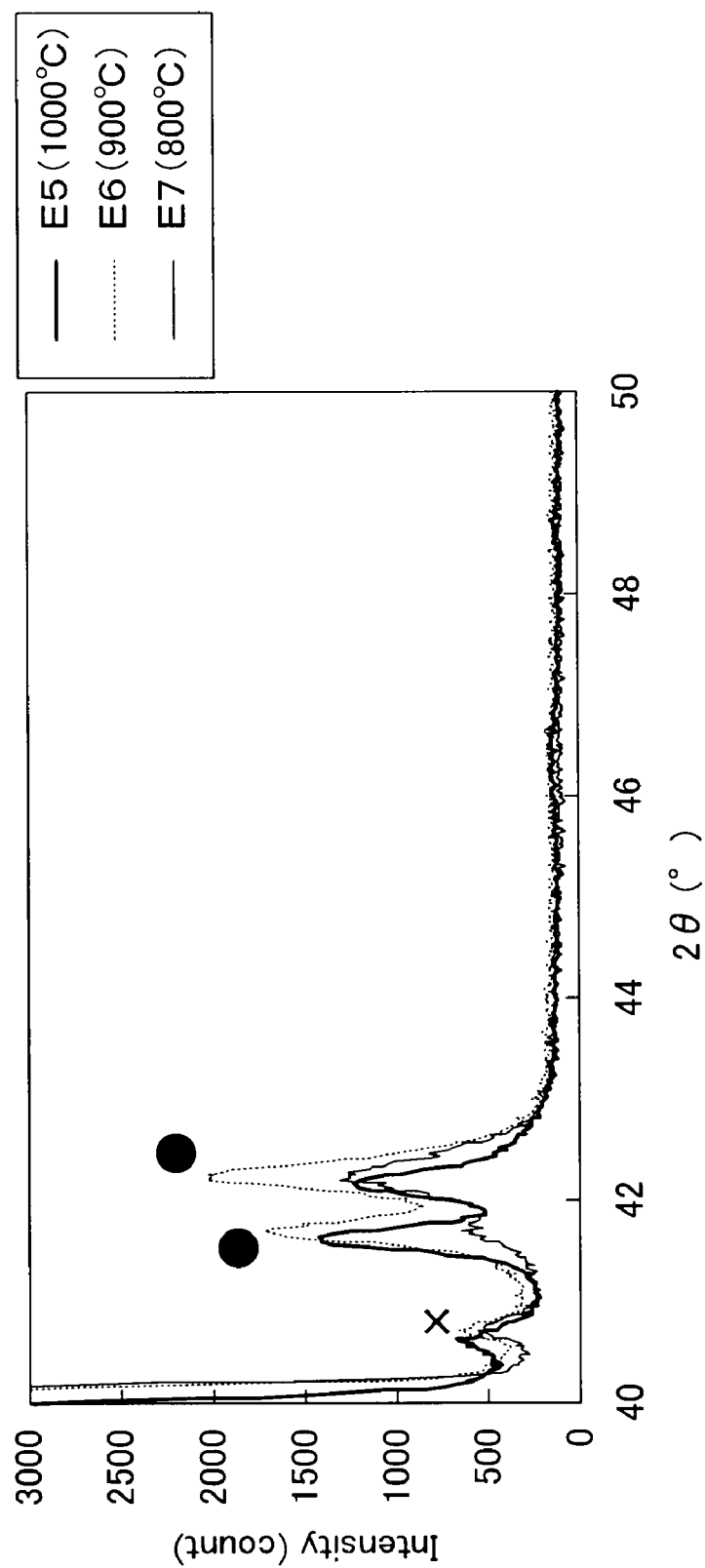
FIG. 17 is an enlarged view of portions that correspond to a diffraction angle in the range of 40 to 50° in FIG. 15.

As shown in FIGS. 15 to 17, as for Samples E5 to E7, it is understood that peaks caused by h-BN, $Ti_2N$, $TiN_{0.3}$, and Ti were confirmed and the electron conductive and corrosion-resistant materials containing h-BN, $Ti_2N$, $TiN_{0.3}$, and Ti were formed. Further, Samples E5 to E7 showed peaks when $2\theta$ was $29.1\pm0.1°$, $41.7\pm0.1°$, and $42.2\pm0.1°$. It is thought that these peaks were specific peaks to the electron conductive and corrosion-resistant material. There was orthorhombic TiB as a material having diffraction peaks at positions when $2\theta$ was $29.1\pm0.1°$, $41.7\pm0.1°$, and $42.2\pm0.1°$. However, TiB had diffraction peaks even when $2\theta$ was $46.4\pm0.1°$ and $48.9\pm0.1°$, the diffraction peaks thereof did not exist in the X-ray diffraction patterns of Samples E5 to E7. Accordingly, it is thought that Samples E5 to E7 were not made of TiB.

Figure 18:
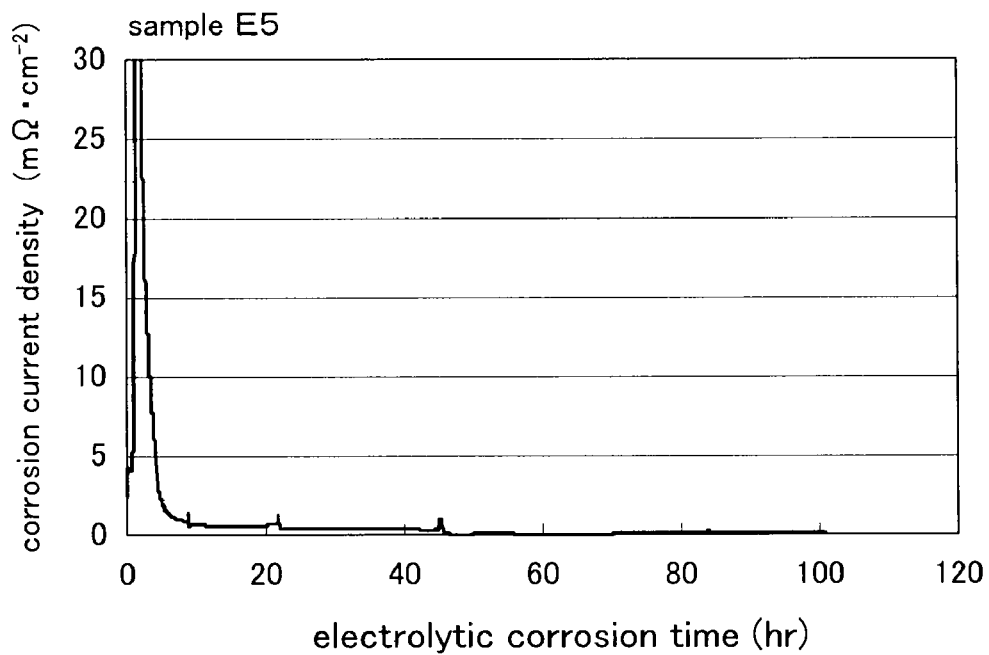
FIG. 18 is a view showing a relationship between corrosion time and corrosion current density of the electron conductive and corrosion-resistant material (Sample E5) formed on the substrate according to Example 2.
Figure 19:
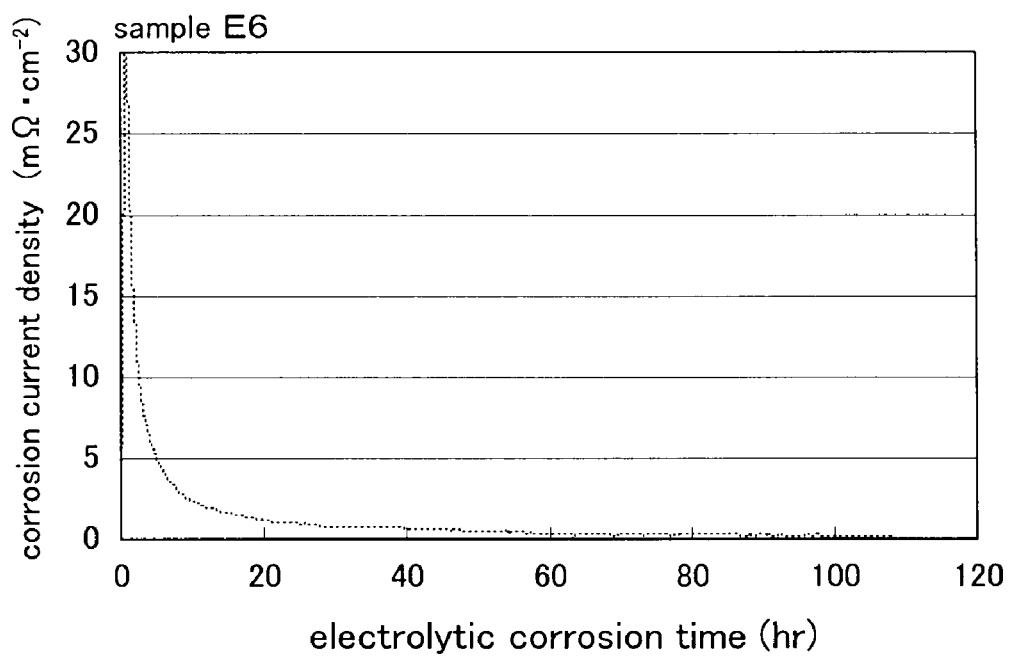
FIG. 19 is a view showing a relationship between corrosion time and corrosion current density of the electron conductive and corrosion-resistant material (Sample E6) formed on the substrate according to Example 2.
Figure 20:
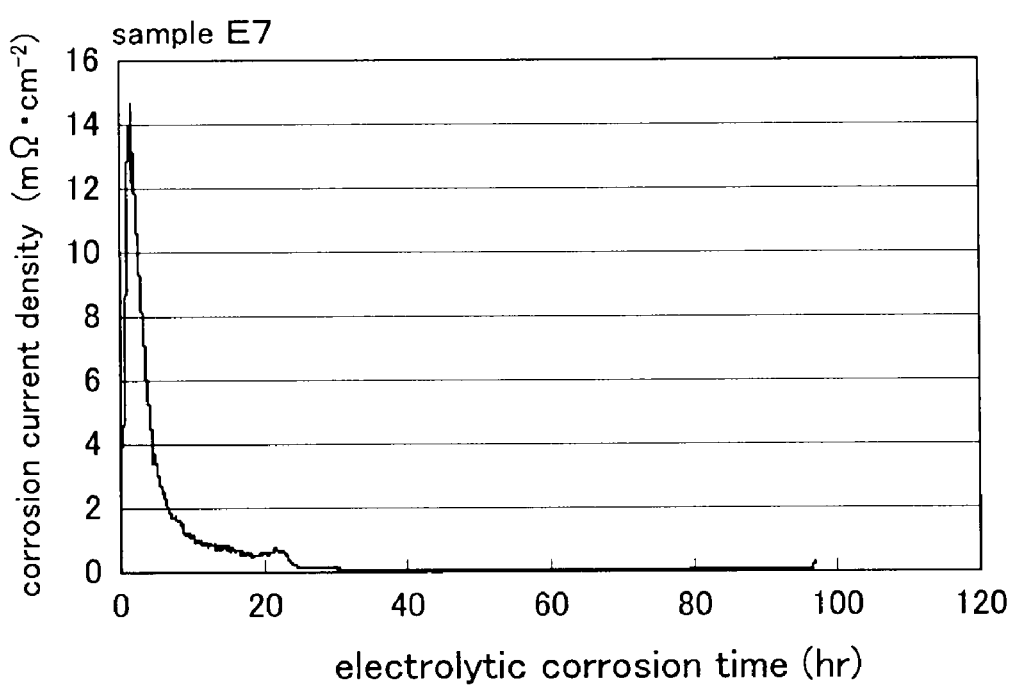
FIG. 20 is a view showing a relationship between corrosion time and corrosion current density of the electron conductive and corrosion-resistant material (Sample E7) formed on the substrate according to Example 2.

Next, the same corrosion test as that of Example 1 was performed on Samples E5 to E7 to measure corrosion resistance. The results thereof are shown in FIGS. 18 to 20. FIG. 18 shows the result of the corrosion test of Sample E5. FIG. 19 shows the result of the corrosion test of Sample E6. FIG. 20 shows the result of the corrosion test of Sample E7.

As shown in FIGS. 18 to 20, as for Samples E5 to E7, the corrosion current density was rapidly decreased in an initial stage of the corrosion test and became constant at about 0.01 $\mu Acm^{-2}$ or less. Accordingly, it is understood that Samples E5 to E7 have excellent corrosion resistance.

After that, a contact-resistance measurement test was performed on measurement samples (Samples E5 to E7) before and after the corrosion test, in order to measure the variation in electron conductivity thereof. The contact-resistance measurement was performed on a sample on which the corrosion test was not performed or a sample on which the corrosion test was performed for 100 hours. The results thereof are shown in FIG. 21.

Further, for the purpose of the comparison with Samples E5 to E7, the contact resistances of three kinds of substrates (Samples C2 to C4) manufactured by Example 1 were also measured in the same manner as described above. The results thereof are also shown in FIG. 21.

Figure 21:
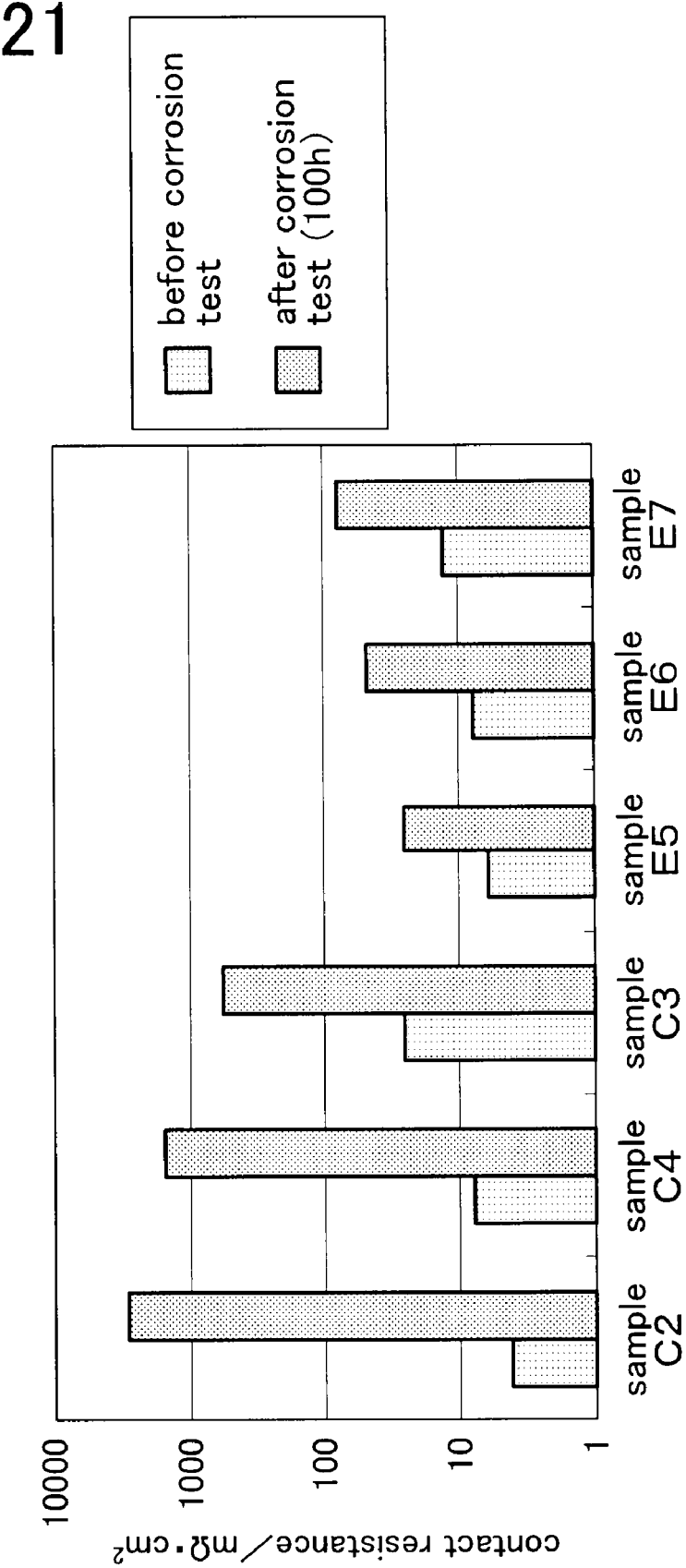
FIG. 21 is a diagram showing a relationship between corrosion time and contact resistances of six kinds of samples (Samples E5 to E7 and C2 to C4) according to Example 2.

As shown in FIG. 21, it is understood that the variation in contact resistance of Samples E5 to E7 before and after the corrosion test is decreased as compared to that of Samples C2 to C4. In addition, even after the corrosion test was performed for 100 hours, Samples E5 to E7 had a significantly low contact resistance value of $100\ m\Omega \cdot cm^2$ or less. Accordingly, it is understood that Samples E5 to E7 have a stable and low contact resistance value.

Example 3

This example is an example where a powdery electron conductive and corrosion-resistant material is manufactured by using Ti powder and boron nitride powder. In this example, a mixing step (adhesion step) and a heating step are performed to manufacture an electron conductive and corrosion-resistant material.

In the mixing step, mixed powder is manufactured by mixing boron nitride powder to Ti powder that contains at least Ti. In the mixing step, it is possible to make boron nitride powder adhere to the surface of the substrate (Ti powder). Accordingly, the mixing step corresponds to the adhesion step of Examples 1 and 2. Further, in the heating step, the electron conductive and corrosion-resistant material is obtained by heating the mixed powder at a temperature of 500 to 1650° C. under a non-oxidizing gas atmosphere.

Specifically, first, Ti powder reagent (that is manufactured by Wako Pure Chemical Industries, Ltd. and has an average grain diameter of 45 μm and a purity of 95% or more) and BN powder reagent (that is manufactured by Kojundo Chemical Lab. Co., Ltd. and has an average grain diameter of 10 μm and a purity of 99% or more) were mixed to each other at a weight ratio of 85:15, so that mixed powder containing Ti powder and boron nitride powder was manufactured (mixing step).

Then, the mixed powder was heated in an Ar gas stream at a temperature 1000° C. for 2 hours (heating step). In this way, there was obtained the powdery electron conductive and corrosion-resistant material. This is referred to as Sample E8.

After that, the X-ray diffraction pattern of Sample E8 was measured in the same manner as Example 1. The measurement was performed in the atmosphere using Rint-1500 manufactured by Rigaku Denki Co., Ltd. as a measuring apparatus. The results of the measurement are shown in FIGS. 22 to 24.

Figure 22:
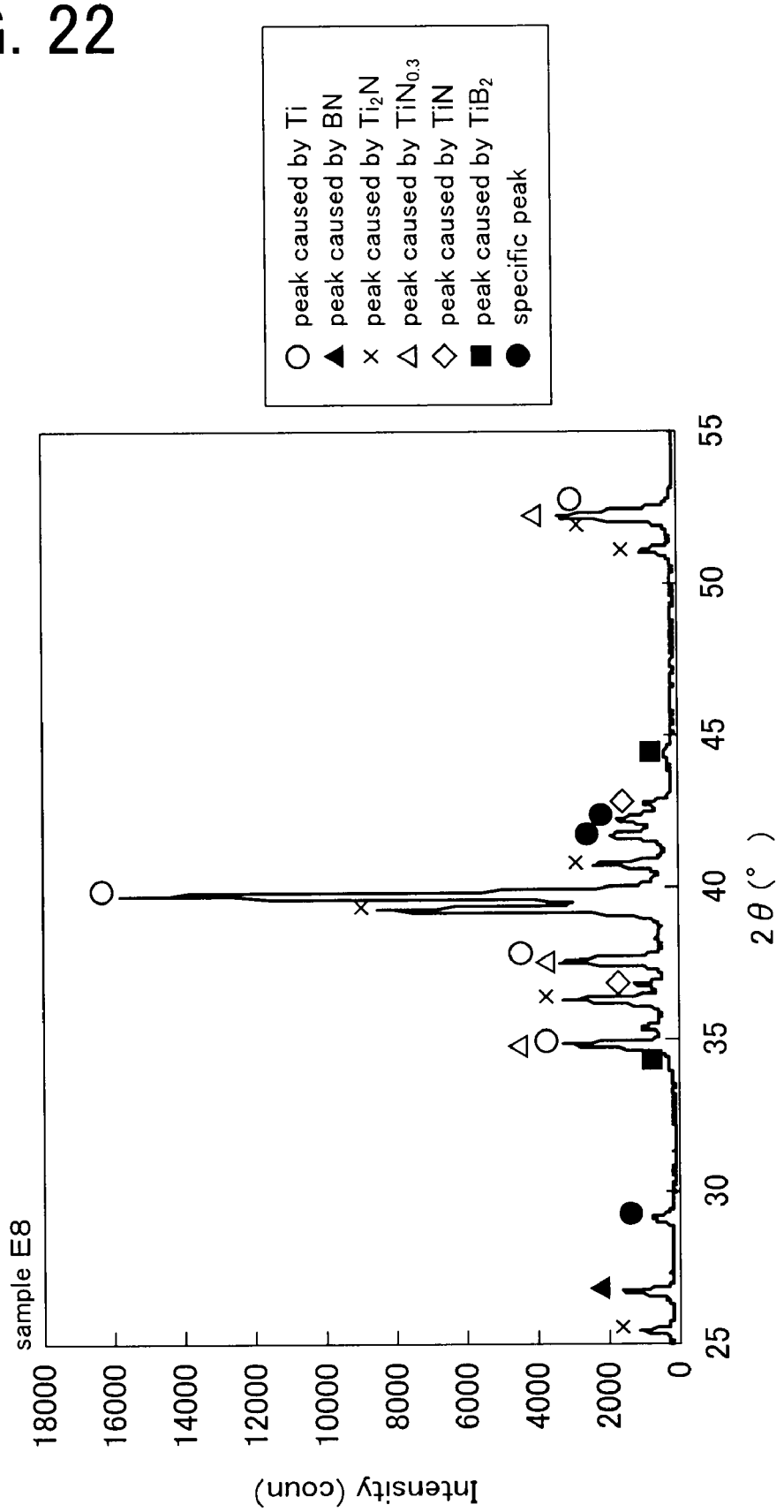
FIG. 22 is a diagram showing an XRD pattern of a powdery electron conductive and corrosion-resistant material according to Example 3.
Figure 23:
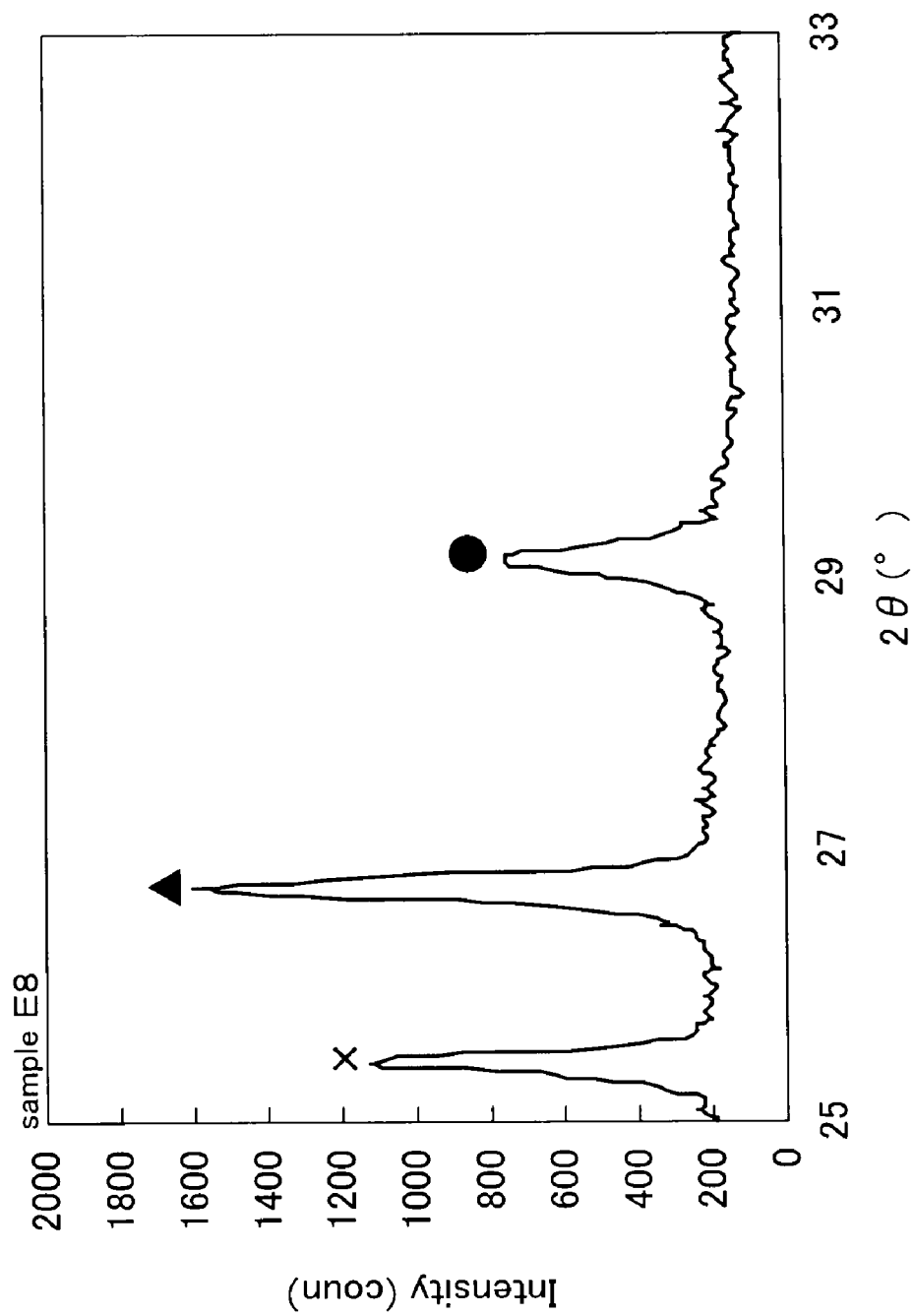
FIG. 23 is an enlarged view of portions that correspond to a diffraction angle in the range of 25 to 33° in FIG. 22.
Figure 24:
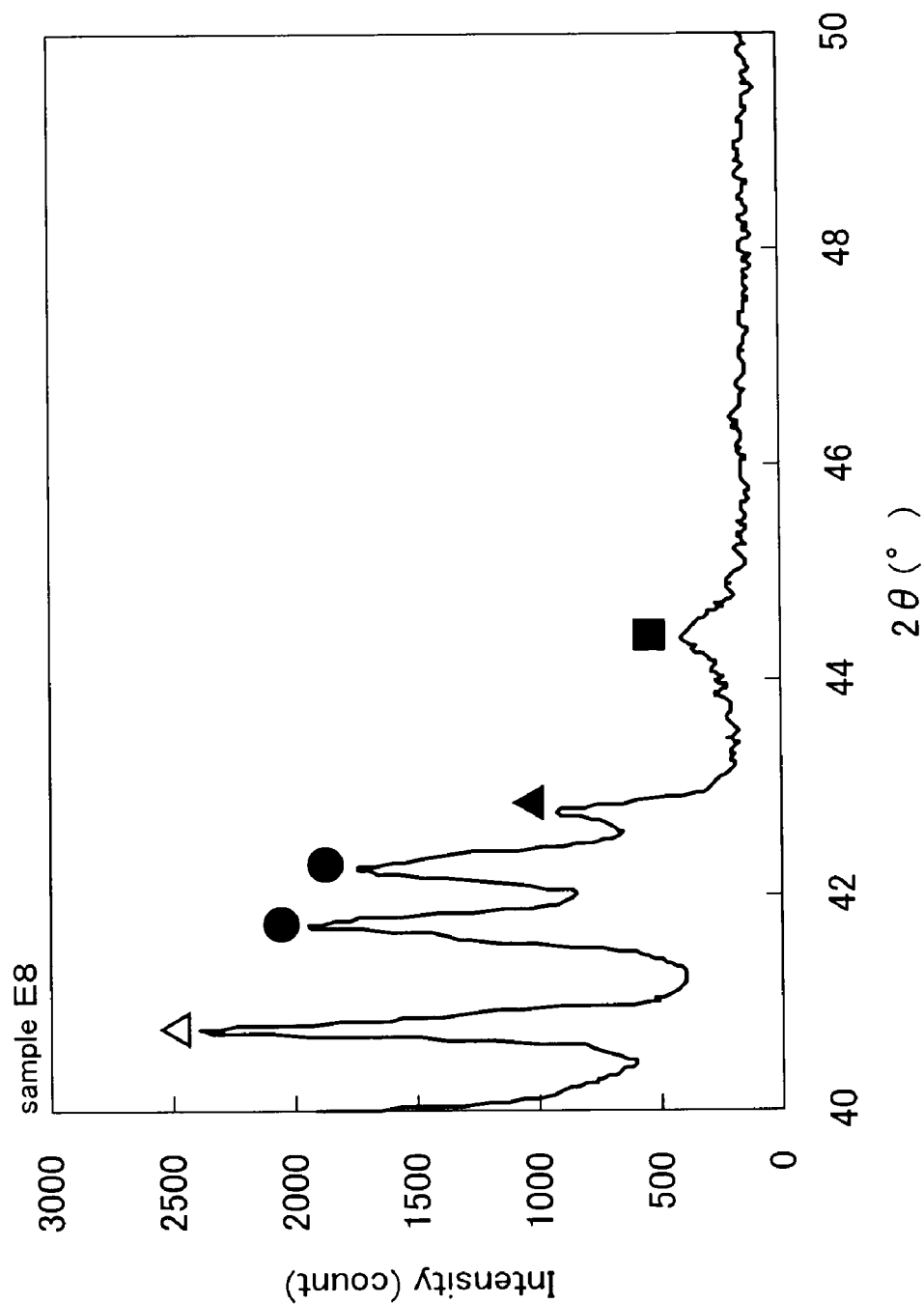
FIG. 24 is an enlarged view of portions that correspond to a diffraction angle in the range of 40 to 50° in FIG. 22.

As shown in FIGS. 22 to 24, even as for Sample E8, the same peaks as those of Samples E1 to E4 of Example 1 and Samples E5 to E7 of Example 2 were observed. That is, even as for Sample E8, it is understood that peaks caused by h-BN, $Ti_2N$, $TiN_{0.3}$, and Ti were confirmed and electron conductive and corrosion-resistant materials containing h-BN, $Ti_2N$, $TiN_{0.3}$, and Ti were formed. Further, as for Sample E8, it is understood that peaks caused by TiN and $TiB_2$ were confirmed and TiN and $TiB_2$ were contained. It is thought that Ti powder and BN powder approached each other in the powder mixing step and B and N reacted to Ti in the powder heating step, so that TiN and $TiB_2$ were generated.

In addition, like Samples E1 to E4 of Example 1 and Samples E5 to E7 of Example 2, Sample E8 showed peaks when $2\theta$ was $29.1\pm0.1°$, $41.7\pm0.1°$, and $42.2\pm0.1°$, and did not show diffraction peaks when $2\theta$ was $46.4\pm0.1°$ and $48.9\pm0.1°$. Accordingly, it is thought that Sample E8 was not made of TiB having peaks when $2\theta$ was $29.1\pm0.1°$, $41.7\pm0.1°$, $42.2\pm0.1°$, $46.4\pm0.1°$, and $48.9\pm0.1°$.

A fact that the material of Sample E8 having the above-mentioned characteristic peaks is not TiB will be further described.

In general, peak intensity is changed on an X-ray diffraction line due to the orientation of a crystal, so that the peaks sometimes seem to disappear. However, in this example, the powdery electron conductive and corrosion-resistant material was manufactured and the XRD measurement was performed on the powder Sample (Sample E8). Accordingly, the peak intensity of the X-ray diffraction of Sample E8 is hardly affected by orientation. This is understood from a fact that the peak caused by α-Ti in the X-ray diffraction pattern (see FIGS. 22 to 24) of Sample E8 corresponds to an intensity ratio significantly approaching the X-ray diffraction pattern (not shown) of α-Ti powder registered in ASTM (American Society for Testing and Materials).

Regardless of that, Sample E8 shows peaks when $2\theta$ is $29.1\pm0.1°$, $41.7\pm0.1°$, and $42.2\pm0.1$, and does not show diffraction peaks when $2\theta$ is $46.4\pm0.1°$ and $48.9\pm0.1°$. This means that the peaks of Sample E8 when $2\theta$ is $29.1\pm0.1°$, $41.7\pm0.1°$, and $42.2\pm0.1$ are peaks caused by a material that is different from orthorhombic TiB and composed of Ti and/or boron and/or nitrogen.

Example 4

In this example, a boriding step and a nitriding step are performed to manufacture a film of the electron conductive and corrosion-resistant material 3 on a substrate 2 as shown in FIG. 25.

Figure 25A:
FIG. 25a is a view showing a cross-section of a substrate according to Example 4.
Figure 25B:
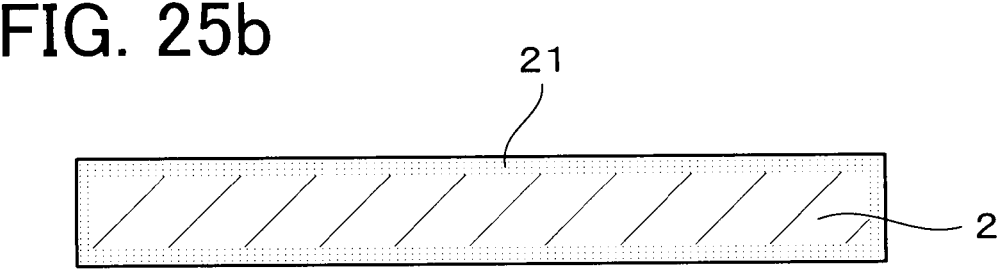
FIG. 25b is a view showing a cross-section of the substrate including a Ti-boride layer formed on the surface thereof according to Example 4.
Figure 25C:
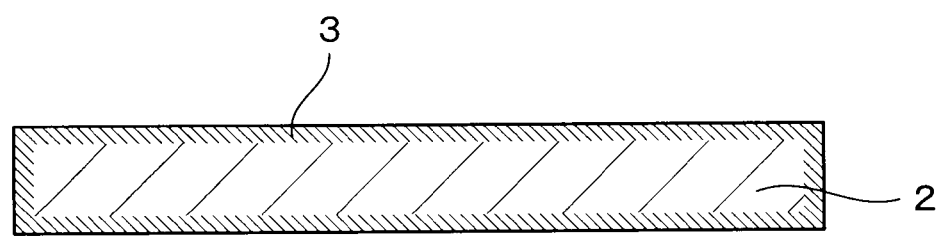
FIG. 25c is a view showing a cross-section of the substrate including the film of an electron conductive and corrosion-resistant material formed on the surface thereof according to Example 4.

As shown in FIG. 25c, the substrate 2, which is made of titanium or titanium alloy and on which the film of the electron conductive and corrosion-resistant material 3 containing at least titanium, boron, and nitrogen is formed is manufactured. The substrate 2 may be used as, for example, metal bipolar plates for a fuel cell.

In the boriding step, the surface of the substrate 2 is borided by a molten salt electrolyzing method using boric-acid-based molten salt as shown in FIGS. 25a and 25b. Accordingly, a Ti-boride layer 21, which contains at least Ti and B, is formed on the surface of the substrate 2.

In the nitriding step, the Ti-boride layer 21 is nitrided as shown in FIGS. 25b and 25c. Accordingly, the film of the electron conductive and corrosion-resistant material 3 is formed on the surface of the substrate 2.

A method of manufacturing the electron conductive and corrosion-resistant material of this example will be described in detail below.

First, as shown in FIG. 25a, a Ti plate (JIS first class) having a thickness of 0.6 mm was prepared as the substrate 2.

After that, mixed molten salt, which is composed of 10 wt % of $K_2O$ and 90 wt % of $B_2O_3$, was prepared. The temperature of the mixed molten salt was adjusted in the range of 950 to 1000° C. The substrate 2 was immersed in the mixed molten salt, and it was electrolyzed in the mixed molten salt for 10 minutes while the substrate 2 was used as a negative electrode and a graphite rod having φ13 mm was used as a positive electrode (boriding step). Meanwhile, current density was about 0.1 A/cm$^2$ during the electrolysis.

Accordingly, as shown in FIG. 25b, the surface of the substrate 2 was borided, and the Ti-boride layer 21 containing at least Ti and B was formed on the surface of the substrate 2. It is thought that the Ti-boride layer 21 was made of $TiB_2$ and TiB.

Subsequently, the molten salt adhering to the substrate was dissolved and washed with warm water.

Next, the substrate on which the Ti-boride layer was formed was placed in a heating furnace, and was heated in a nitrogen gas stream at a temperature of 1000° C. for 2 hours (nitriding step). In this case, nitrogen gas flowed into the heating furnace at a flow rate of 0.5 L/min.

Accordingly, as shown in FIGS. 25b and 25c, the Ti-boride layer 21 formed on the substrate 2 was nitrided, and the film of the electron conductive and corrosion-resistant material 3 containing at least titanium, boron, and nitrogen was formed on the surface of the substrate 2. The substrate 2 on which the electron conductive and corrosion-resistant material 3 manufactured as described above was formed is referred to as Sample E9.

Further, in this example, the substrate (Sample E10) including the film of the electron conductive and corrosion-resistant material formed on the surface thereof, was manufactured using a Ti alloy plate as the substrate.

Sample E10 was manufactured in the same manner as Sample E1 except that the Ti alloy plate was used instead of the Ti plate. An alloy plate, which contained about 90 mass % of Ti, 6 mass % of Al, and 4 mass % of V and had a thickness of 0.6 mm, was used as the Ti alloy plate.

After that, the corrosion test was performed using Samples E9 and E10 to measure contact resistance of the samples before and after the corrosion test.

First, for the purpose of the comparison with Sample E9, three kinds of substrates (Samples C5 to C7) were manufactured.

Sample C5 is a titanium plate (JIS first class) having a thickness of 0.6 mm. This is the same titanium plate as that used to manufacture Sample E9.

Sample C6 is a substrate that is obtained by nitriding the surface of a titanium plate (JIS first class).

In order to manufacture the sample, first, the same titanium plate (JIS first class) as that of Sample E9 was prepared. Then, the titanium plate was placed in a heating furnace, and was heated in a nitrogen gas stream (flow rate: 0.5 L/min) at a temperature of 1000° C. for 2 hours like in the nitriding step. In this way, there was obtained a substrate (Sample C6) that is formed by nitriding the surface of the titanium plate. As for Sample C6, it is thought that a layer made of TiN was formed on the surface of the titanium plate by nitriding the surface of the titanium plate.

Further, Sample C7 is a substrate that is formed by boriding the surface of a titanium plate (JIS first class).

In order to manufacture the sample, first, the same titanium plate (JIS first class) as that of Sample E9 was prepared. Then, like in the boriding step, the titanium plate was immersed in the mixed molten salt (temperature: 950 to 1000° C.) that was composed of 10 wt % of $K_2O$ and 90 wt % of $B_2O_3$, and electrolysis (current density: about 0.1 A/cm$^2$) was performed in the mixed molten salt for 10 minutes while the titanium plate was used as a negative electrode and a graphite rod having φ13 mm was used as a positive electrode. Accordingly, there was obtained the substrate (Sample C7) that was formed by boriding the surface of the titanium plate. As for Sample C7, it is thought that a layer made of $TiB_2$ and/or TiB was formed on the surface of the titanium plate by boriding the surface of the titanium plate.

Further, for the purpose of the comparison with Sample E10, three kinds of substrates (Samples C8 to C10) were manufactured.

Sample C8 is a Ti alloy plate having a thickness of 0.6 mm. The Ti alloy plate is the same alloy plate, which contains about 90 mass % of Ti, 6 mass % of Al, and 4 mass % of V, as that used to manufacture Sample E10.

Sample C9 is a substrate that is formed by nitriding the surface of a Ti alloy plate.

In order to manufacture the sample, first, the same Ti alloy plate as that of Sample E10 was prepared. Then, the Ti alloy plate was placed in a heating furnace, and was heated in a nitrogen gas stream (flow rate: 0.5 L/min) at a temperature of 1000° C. for 2 hours like in the nitriding step. In this way, there was obtained the substrate (Sample C9) that is formed by nitriding the surface of the titanium alloy plate. As for Sample C9, it is thought that a layer made of TiN was formed on the surface of the titanium alloy plate by nitriding the surface of the titanium alloy plate.

Sample C10 is a substrate that is formed by boriding the surface of a titanium alloy plate.

In order to manufacture the sample, first, the same titanium alloy plate as that of Sample E10 was prepared. Then, like in the boriding step, the titanium alloy plate was immersed in the mixed molten salt (temperature: 950 to 1000° C.) that was composed of 10 wt % of $K_2O$ and 90 wt % of $B_2O_3$, and electrolysis (current density: about 0.1 A/cm$^2$) was performed in the mixed molten salt for 10 minutes while the titanium alloy plate was used as a negative electrode and a graphite rod having φ13 mm was used as a positive electrode. Accordingly, there was obtained the substrate (Sample C10) that was formed by boriding the surface of the titanium alloy plate. As for Sample C10, it is thought that a layer made of $TiB_2$ and/or TiB was formed on the surface of the titanium alloy plate by boriding the surface of the titanium alloy plate.

After that, a corrosion test was performed on Samples E9, E10, and C5 to C10. The corrosion test was performed in the same manner as Example 1. In this example, a voltage of 0.26 V was applied between the reference electrode 43 and the measurement sample 1 for 200 hours that was the maximum.

Further, a contact-resistance measurement same as in Example 1 was performed on the measurement samples (Samples E1, E2, and C1 to C6) before and after the corrosion, in order to measure the variation in conductive property thereof.

As for Samples E9, E10, and C5 to C10, contact resistances of the sample on which the corrosion test was not performed and the sample on which the corrosion test was performed for 100 hours (voltage application time) were measured.

Figure 26:
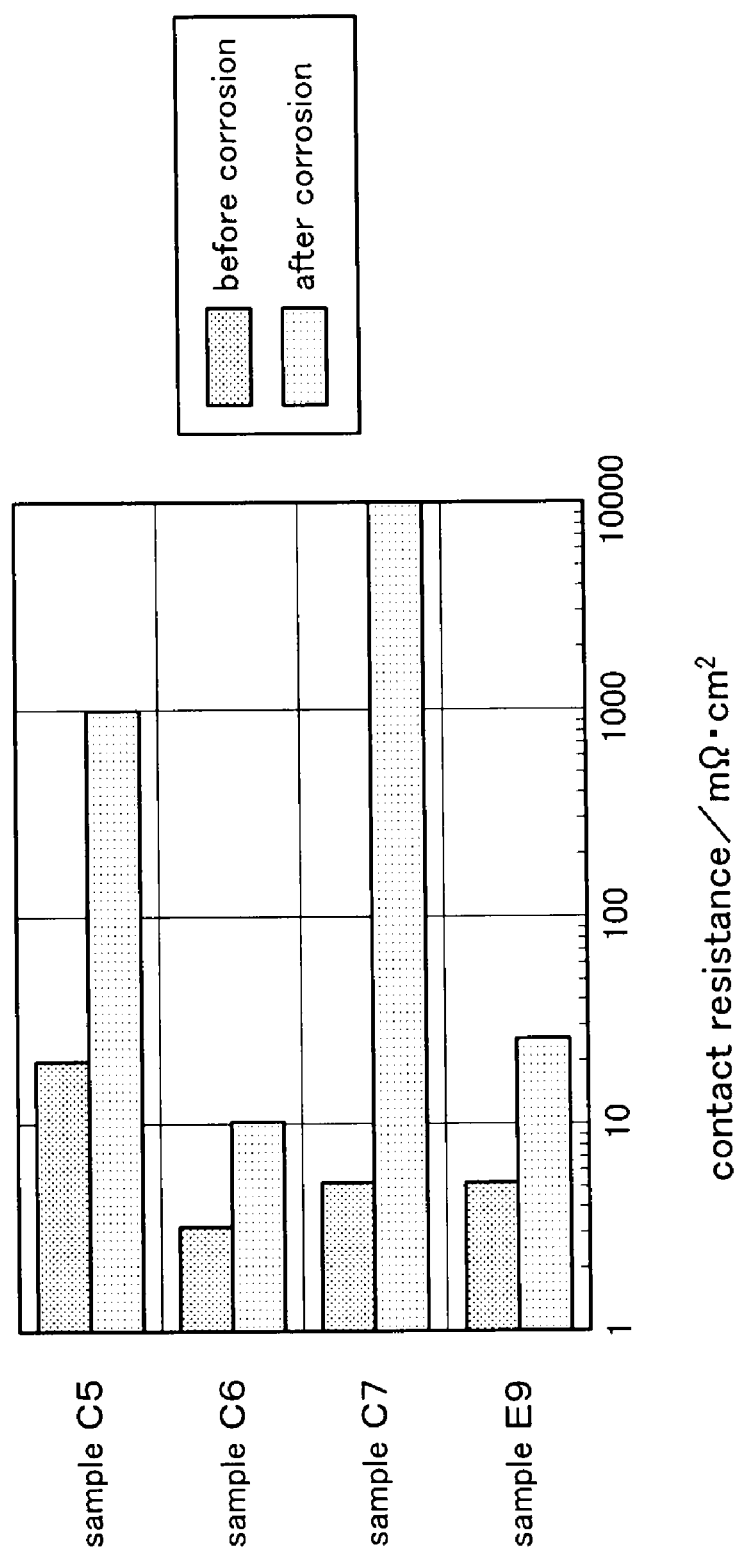
FIG. 26 is a view showing contact resistances of substrates (Samples E9 and C5 to C7) before and after a corrosion test according to Example 4.
Figure 27:
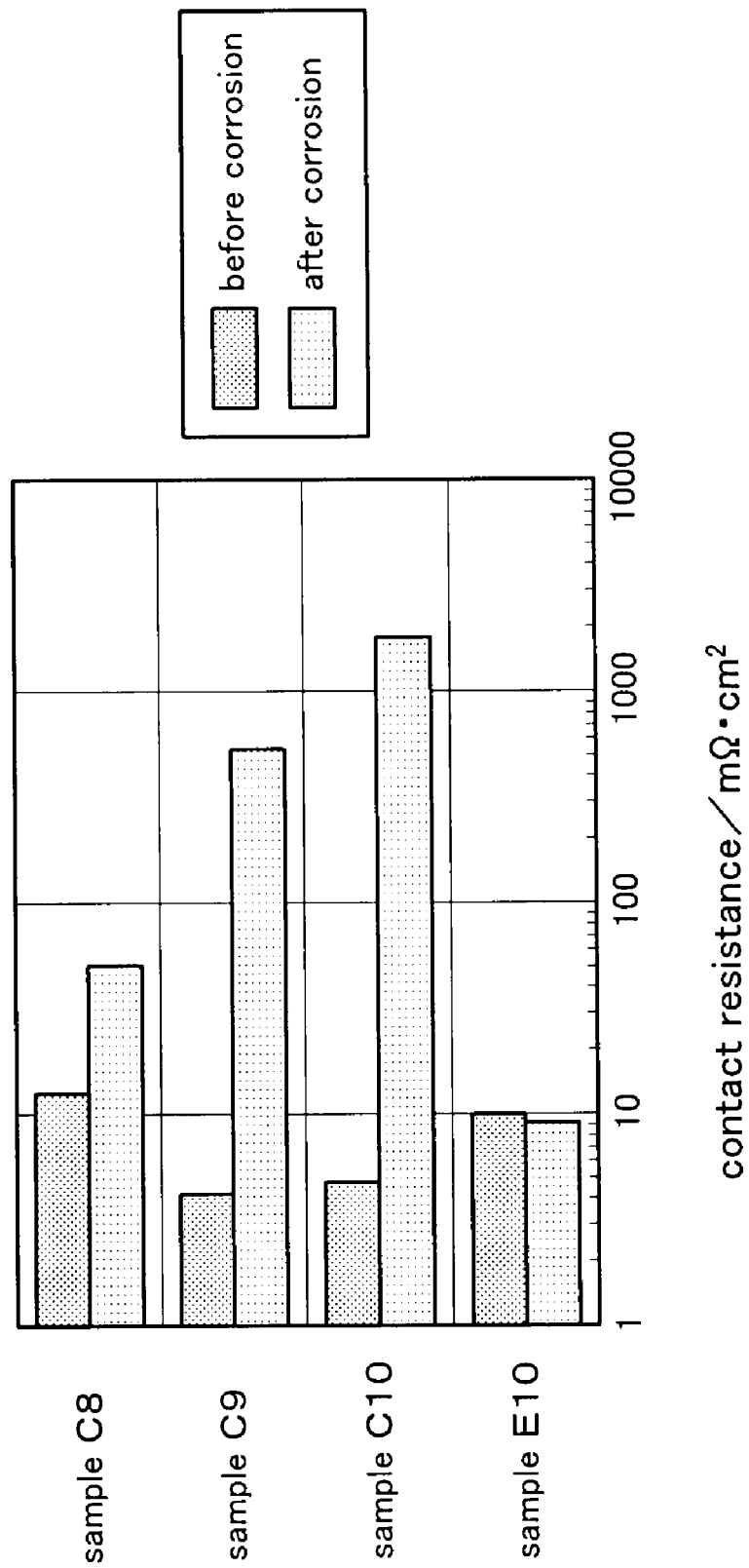
FIG. 27 is a view showing contact resistances of substrates (Samples E10 and C8 to C10) before and after a corrosion test according to Example 4.

The results thereof are shown in FIGS. 26 and 27.

In addition, as for Sample E9, E10, and C5 to C7, contact resistances of the sample on which the corrosion test was not performed and samples on which the corrosion test was performed for 50, 100, and 200 hours were measured, and the temporal change thereof were measured. The results thereof are shown in FIG. 28.

Figure 28:
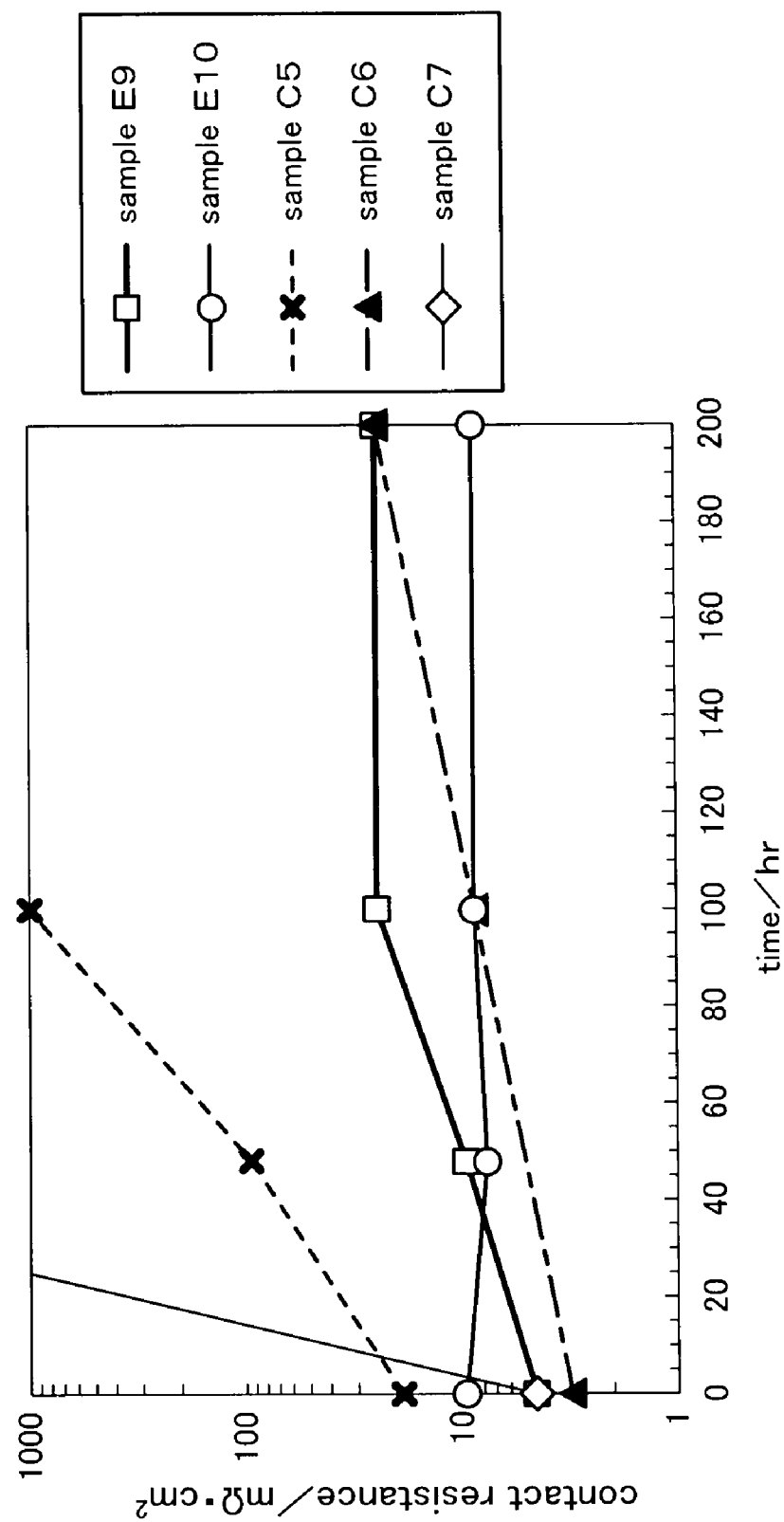
FIG. 28 is a view illustrating the temporal change of contact resistances of substrates (Samples E9, E10, and C5 to C7) during a corrosion resistance test according to Example 4.

FIG. 28 is a semi-logarithmic graph, a horizontal axis represents corrosion time (voltage application time), and a vertical axis represents a contact resistance.

As shown in FIG. 26, Samples E9 and C7 had substantially the same contact resistance before the corrosion, and the contact resistance of Sample C5 was a slightly higher than those of Samples E9 and C7 before the corrosion. These samples had sufficient electron conductivity before the corrosion. However, after the corrosion test was performed for 100 hours, contact resistances of Samples C5 and C7 were significantly increased. In contrast, after the corrosion test was performed for 100 hours, the increase of contact resistance of Sample E9 including the electron conductive and corrosion-resistant material on the surface thereof was suppressed. Accordingly, it is understood that Sample E9 has excellent corrosion resistance.

Meanwhile, after the corrosion test is performed for 100 hours, Sample C6 also has low contact resistance. Accordingly, it seems that corrosion resistance was excellent (see FIG. 26). However, as shown in FIG. 28, it is understood that the contact resistance of Sample C2 is further increased if the corrosion test is performed for 100 hours or more. In FIG. 28, data is shown only until 200 hours. However, since contact resistance of Sample C6 is linearly increased with time in the semi-logarithmic graph, it is thought that contact resistance is further increased even after 200 hours. The reason for this is thought that TiN formed on the surface of Sample C6 is apt to react to water, so that hydrolysis occurs.

In contrast, as shown in FIG. 28, contact resistance of the Sample E9 is hardly increased after the corrosion test is performed for 100 hours. That is, it is thought that contact resistance of Sample E9 becomes almost plateau after the corrosion test is performed for 100 hours.

Accordingly, it is understood that corrosion resistance of Sample E9 including the electron conductive and corrosion-resistant material is more excellent than those of Samples C5 to C7.

Further, even though Samples E10 is compared with Samples C8 to C10, it is understood that corrosion resistance of Sample E10 on which the electron conductive and corrosion-resistant material is formed is improved as shown in FIG. 27. In particular, it is understood that contact resistance of Sample E10, which is manufactured using a Ti alloy plate containing Al and V, is hardly changed before and after the corrosion test and corrosion resistance thereof is significantly excellent.

Furthermore, if the corrosion test was performed, contact resistances of Samples C5 to C7 were increased with time as shown in FIG. 28. In particular, contact resistances of Samples C5 and C7 were increased up to 1000 mΩ·cm² or more in a very early stage of less than 100 hours. In addition, as described above, contact resistance of Sample C6 were also continuously increased with time in accompanied with the corrosion.

In contrast, contact resistances of Samples E9 and E10 became almost plateau after the corrosion test was performed for about 100 hours, and the contact resistances thereof were hardly changed even after the corrosion test was performed for 100 hours or more.

As described above, it is understood that Samples E9 and E10 had electron conductivity and excellent corrosion resistance.

The reason why each of the substrates (Samples E9 and E10) including the electron conductive and corrosion-resistant materials on the surfaces thereof, can provide excellent electron conductivity and corrosion resistance as described above is not clear, but the reason for this is thought as follows:

That is, the electron conductive and corrosion-resistant material formed on the surfaces of each of Samples E9 and E10 contains Ti, B, and N. Further, as expected from the periodic table, Ti of the electron conductive and corrosion-resistant material can exist while approaching a stable quadrivalent element. For this reason, as described above, it is thought that corrosion resistance is improved while electron conductivity is maintained.

In particular, at least the surface of the substrate of Sample E10 is made of a titanium alloy plate that contains Al belonging to 3B group elements of the periodic table and V belonging to 5A group elements of the periodic table.

Accordingly, Al and V are contained in the electron conductive and corrosion-resistant material of Sample E10 in addition to Ti, B, and N. Therefore, it is thought that Ti of the electron conductive and corrosion-resistant material is apt to approach a stable quadrivalent element. For this reason, it is thought that corrosion resistance of Sample E10 was further increased as described above.

In contrast, a layer, which is made of $TiB_2$ or TiN or the like having electron conductivity, is formed on the surface of each of Samples C6, C7, C9, and C10. However, since the valence of Ti of $TiB_2$ or TiN is significantly out of 4, it is thought that each of the samples has electron conductivity but is apt to be corroded as described above.

Further, the reason why the electron conductive and corrosion-resistant material of each of Samples E9 and E10 has a chemical stability and excellent electron conductivity is thought that the electron conductive material made of at least Ti, B, and N has crystal structure including a conduction band.

Furthermore, Samples E9 and E10 of this example can be simply manufactured by the boriding step and the nitriding step. If Samples E9 and E10 are used as the metal bipolar plates for the fuel cell, expensive noble metal does not need to be used unlike in the related art. Accordingly, it is possible to manufacture the metal bipolar plates for the fuel cell at low cost.

As described above, according to this example, it is possible to manufacture an electron conductive and corrosion-resistant material, which has excellent electron conductivity and corrosion resistance, at low cost.

Example 5

In this example, as shown in FIG. 29, a thermal spraying step and a nitriding step are performed to manufacture the film of the electron conductive and corrosion-resistant material 3 on a metal substrate 2.

Figure 29A:
FIG. 29a is a view showing a cross-section of a substrate according to Example 5.
Figure 29B:
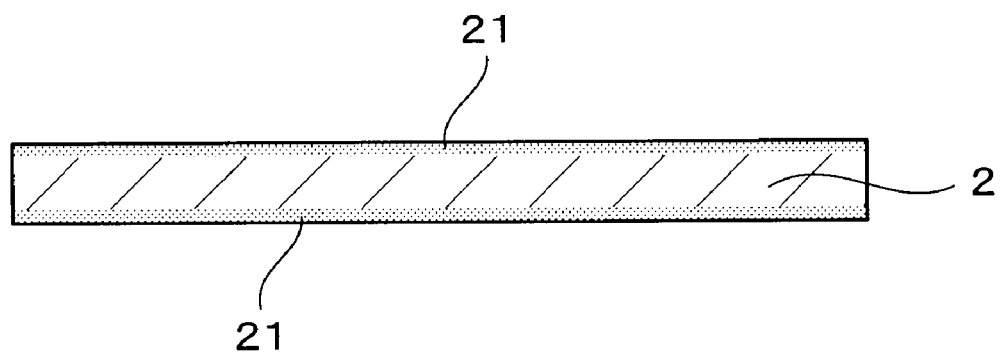
FIG. 29b is a view showing a cross-section of the substrate including a $TiB_2$ layer formed on the surface thereof according to Example 5.
Figure 29C:
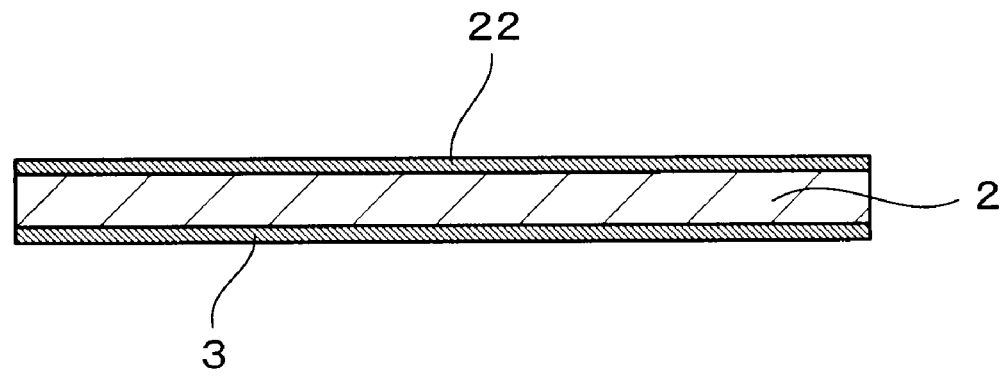
FIG. 29c is a view showing a cross-section of the substrate including a film made of an electron conductive and corrosion-resistant material formed on the surface thereof according to Example 5.

In this example, the metal substrate 2, which is made of titanium and on which the electron conductivity and corrosion-resistant material 3 containing at least titanium, boron, and nitrogen is formed is manufactured as shown in FIG. 29c. The metal substrate 2 may be used as, for example, metal bipolar plates for a fuel cell.

In the thermal spraying step, as shown in FIGS. 29a and 29b, $TiB_2$ powder is sprayed onto at least a part of the surface of the metal substrate 2. Accordingly, a $TiB_2$ layer 21 formed of $TiB_2$ particles is formed on the surface of the metal substrate 2.

In the nitriding step, as shown in FIGS. 29b and 29c, the $TiB_2$ layer 21 is nitrided. Accordingly, the film of the electron conductive and corrosion-resistant material 3 is formed on the surface of the metal substrate 2.

A method of manufacturing the electron conductive and corrosion-resistant material of this example will be described in detail below.

Further, as shown in FIG. 29a, a Ti plate (JIS first class) having a thickness of 0.6 mm was prepared as the metal substrate 2.

Then, the metal substrate 2 was heated at a temperature of about 60° C., and $TiB_2$ powder was sprayed onto both surfaces of the metal substrate 2 by plasma spraying (thermal spraying step). Accordingly, as shown in FIG. 29b, a $TiB_2$ layer 21 formed of $TiB_2$ particles was formed on both surfaces of the metal substrate 2. Granulated powder having a primary grain diameter of 1.0 to 4.5 μm and a grain size of 10 to 63 μm, was used as the $TiB_2$ powder. Further, as for the plasma spraying, Ar—$N_2$ spraying was performed by a plasma spraying apparatus (9 MB), which was manufactured by Sulzer Metco Inc., under conditions where a spraying distance was 100 mm, a feed rate of $TiB_2$ powder was 32.8 g/min, a ratio of Ar:$N_2$ was 50:50 (L/min), and current was 500 A.

Subsequently, the metal substrate 2 on which the $TiB_2$ layer 21 was formed was placed in a heating furnace, and the substrate 2 was heated in a nitrogen gas stream at a temperature of 1000° C. for 2 hours (nitriding step). In this case, nitrogen gas flowed into the heating furnace at a flow rate of 0.5 L/min.

Accordingly, as shown in FIGS. 29b and 29c, the $TiB_2$ layer 21 formed on the metal substrate 2 was nitrided, and the film of the electron conductive and corrosion-resistant material 3 containing at least titanium, boron, and nitrogen was formed on the surface of the substrate 2. The substrate 2 on which the electron conductive and corrosion-resistant material 3 manufactured as described above was formed is referred to as Sample E11.

Further, in this example, a spraying condition of the thermal spraying step was changed and a metal substrate (Sample E12) including the film of the electron conductive and corrosion-resistant material on the surface thereof was manufactured.

Sample E12 was manufactured in the same manner as Sample E11 except that the spraying condition of the thermal spraying step was changed from Ar—$N_2$ spraying into Ar—$H_2$ spraying.

Specifically, while Sample E12 was manufactured, Ar—$H_2$ spraying was performed in the thermal spraying step under conditions where a spraying distance was 100 mm, a feed rate of $TiB_2$ powder was 32.8 g/min, a ratio of Ar:$H_2$ was 80:20 (L/min), and current was 600 A. Accordingly, the $TiB_2$ layer was formed on both surfaces of the metal substrate. After that, like Sample E11, the nitriding step was performed to nitride the $TiB_2$ layer, so that a layer formed by the electron conductive and corrosion-resistant material was formed on the metal substrate.

After that, the corrosion test was performed using Samples E11 and E12 to measure contact resistance of the samples before and after the corrosion test.

First, for the purpose of the comparison with Samples E11 and E12, three kinds of substrates (Samples C11 to C13) were manufactured.

Sample C11 is a titanium plate (JIS first class) having a thickness of 0.6 mm. This is the same titanium plate as that used to manufacture each of Samples E11 and E12.

Sample C12 is a substrate that is obtained by nitriding the surface of a titanium plate (JIS first class).

In order to manufacture the sample, first, the same titanium plate (JIS first class) as that of Sample E11 was prepared. Then, the titanium plate was placed in a heating furnace, and was heated in a nitrogen gas stream (flow rate: 0.5 L/min) at a temperature of 1000° C. for 2 hours in the nitriding step. In this way, there was obtained a substrate (Sample C12) that is formed by nitriding the surface of the titanium plate. As for Sample C12, it is thought that a layer made of TiN was formed on the surface of the titanium plate by nitriding the surface of the titanium plate.

Further, Sample C13 is a substrate that is formed by forming a $TiB_2$ layer formed of $TiB_2$ particles on the surface of a titanium plate (JIS first class).

In order to manufacture the sample, first, the same titanium plate (JIS first class) as that of Sample E11 was prepared. Then, the titanium plate was heated at a temperature of about 60° C., plasma spraying (Ar—$N_2$ spraying) was performed under the same conditions as those of Sample E11, and $TiB_2$ powder was sprayed onto both surfaces of the titanium plate. In this way, there was obtained the substrate (Sample C13) that is formed by forming a $TiB_2$ layer formed of $TiB_2$ particles on the surface of a titanium plate.

After that, a corrosion test was performed on Samples E11, E12, and C11 to C13. The corrosion test was performed in the same manner as Example 1. In this example, a voltage of 0.26 V was applied between the reference electrode 43 and the measurement sample 1 for 200 hours that was the maximum.

Further, contact resistance was measured on the samples (Samples E11, E12, and C11 to C13) before and after the corrosion test, in order to measure the variation in conductive property thereof.

Figure 30:
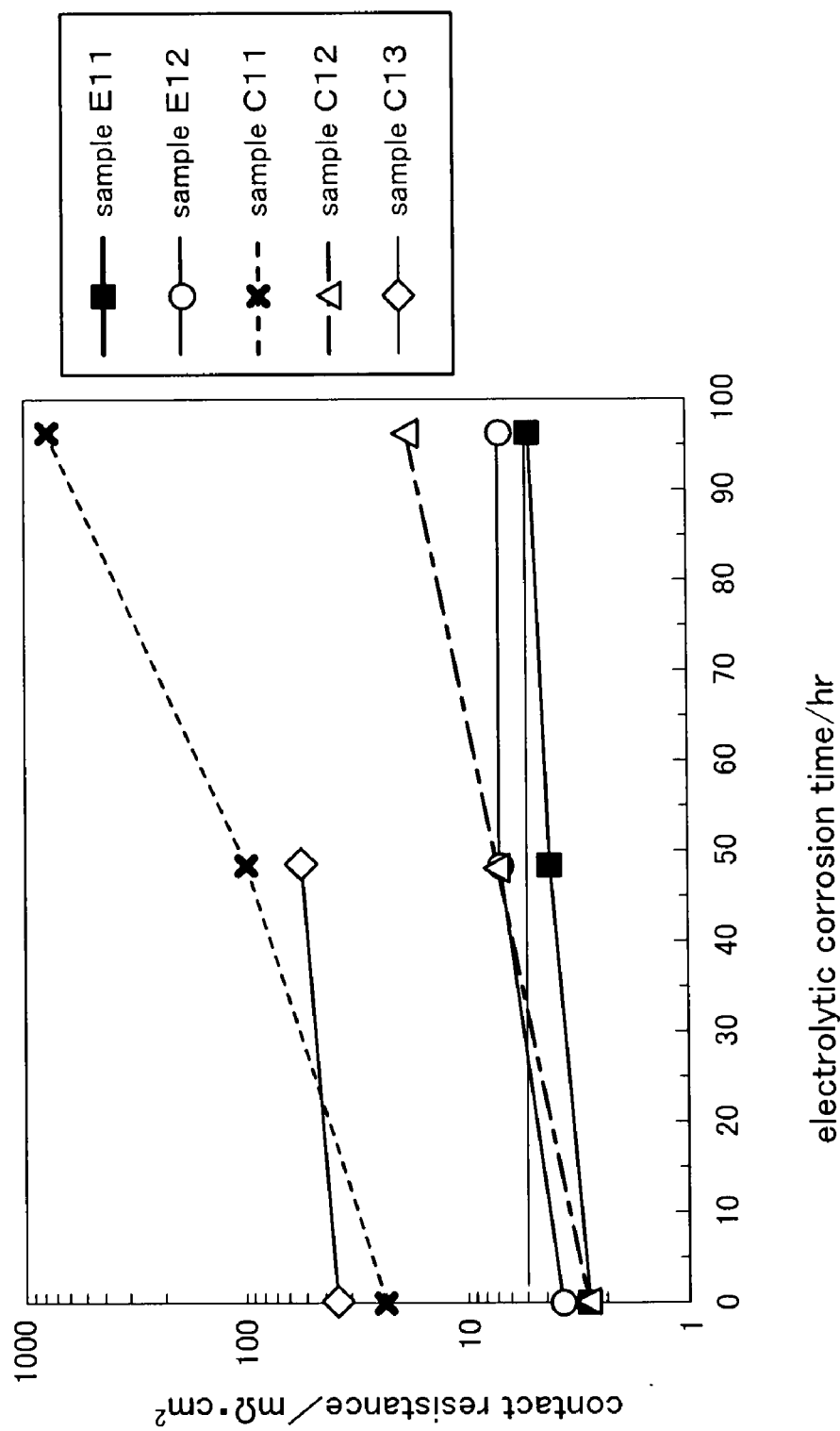
FIG. 30 is a view illustrating the temporal change of contact resistances of substrates (Samples E11, E12, and C11 to C13) during a corrosion resistance test according to Example 5.

As for Samples E11, E12, and C11 to C13, contact resistances of a sample on which the corrosion test was not performed and samples on which the corrosion test was performed for 48 and 96 hours were measured, and the temporal changes thereof were measured. The results thereof are shown in FIG. 30. Meanwhile, since Sample C13 had significantly high contact resistance in a relatively initial period of a corrosion test as described below, the measurement corresponding to 96 hours was not performed for experimental efficiency.

Meanwhile, FIG. 30 is a semi-logarithmic graph, a horizontal axis represents corrosion time (voltage application time), and a vertical axis represents a contact resistance.

As seen from FIG. 30, it is understood that contact resistances of Samples C11 and C13 are large before the corrosion test start, and contact resistances thereof are further increased with time after the corrosion test. In contrast, contact resistances of Samples E11 and E12 including the electron conductive and corrosion-resistant materials are small, and contact resistances thereof are hardly increased even though the corrosion test.

Accordingly, it is understood that each of Samples E11 and E12 has excellent electron conductivity and also has excellent corrosion resistance.

Further, corrosion resistance of Sample C12 is lower than those of Samples E11 and E12, but seems to have relatively excellent corrosion resistance (see FIG. 30). However, as shown in FIG. 30, contact resistance of Sample C12 is linearly increased with time in the semi-logarithmic graph. In FIG. 30, data is shown only until 96 hours, but it is thought that contact resistance is increased even after 96 hours. The reason for this is thought that TiN formed on the surface of Sample C12 is apt to react to water, so that hydrolysis occurs.

In contrast, as shown in FIG. 30, contact resistances of the Samples E11 and E12 are hardly increased after the corrosion test for 48 hours. That is, it is thought that contact resistances of Samples E11 and E12 become almost plateau after the corrosion test for 48 hours.

Accordingly, it is understood that each of Sample E11 and E12 including the electron conductive and corrosion-resistant materials has excellent electron conductivity and has excellent corrosion resistance as compared to Samples C11 to C13.

The reason why each of the substrates (Samples E11 and E12) including the electron conductive and corrosion-resistant materials on the surfaces thereof, can exhibit excellent electron conductivity and corrosion resistance as described above is not clear, but the reason for this is thought as follows:

That is, the electron conductive and corrosion-resistant material formed on the surfaces of each of Samples E11 and E12 contains Ti, B, and N. Further, as expected from the periodic table, Ti of the electron conductive and corrosion-resistant material can exist while approaching a stable quadrivalent element. For this reason, as described above, the electron conductive and corrosion-resistant material has excellent electron conductivity and can maintain excellent electron conductivity even though being exposed to corrosion conditions. That is, the electron conductive and corrosion-resistant material has excellent electron conductivity and corrosion resistance.

In contrast, a layer, which is made of $TiB_2$ or TiN or the like having electron conductivity, is formed on the surface of each of Samples C12 and C13. However, since the valence of Ti of $TiB_2$ or TiN is significantly out of 4, it is thought that each of the samples has electron conductivity but is apt to be corroded as described above.

Further, the reason why the electron conductive and corrosion-resistant material of each of Samples E11 and E12 has a chemical stability and excellent electron conductivity as described above is thought that the electron conductive material made of at least Ti, B, and N has crystal structure where electrons exist in a conduction band.

Furthermore, Samples E11 and E12 of this example can be simply manufactured by the thermal spraying step and the nitriding step. If Samples E11 and E12 are used as the metal bipolar plates for the fuel cell, expensive noble metal does not need to be used unlike in the related art. Accordingly, it is possible to manufacture the metal bipolar plates for the fuel cell at low cost.

As described above, according to this example, it is possible to manufacture the electron conductive and corrosion-resistant material, which has excellent electron conductivity and corrosion resistance, at low cost.

Example 6

This example is an example where six kinds of electron conductive and corrosion-resistant materials are manufactured on substrates by different methods, the composition ratio thereof are measured, and the characteristics thereof are evaluated.

First, like in Example 1, an adhesion step, which includes an application step and a drying step, and a heating step were performed to manufacture the electron conductive and corrosion-resistant material.

Specifically, first, a Ti plate (JIS first class), which was manufactured by Kobe Steel, Ltd. and had a thickness of 0.6 mm, was prepared as the substrate.

After that, like in Example 1, there was prepared a mixed solvent where n-hexane and isopropanol were mixed to each other, and boron nitride dispersion liquid was manufactured by adding 20 parts by weight of boron nitride powder to 80 parts by weight of the mixed solvent. Powder made of boron nitride (h-BN) having hexagonal crystal structure was used as the boron nitride powder. The boron nitride dispersion liquid was applied to the surface of the substrate by spraying (application step), and the substrate was then dried in a thermostatic chamber having temperature of 80° for several minutes (drying step). After that, the substrate to which the boron nitride powder adhered was heated in the Ar gas stream at a temperature of 800° C. for 2 hours (heating step). Subsequently, impurities adhering to the surface of the substrate were removed by washing the substrate with water and acetone. In this way, there was obtained the substrate including the film made of the electron conductive and corrosion-resistant material on the surface thereof. This is referred to as Sample E13.

Further, the heating temperature and heating time of the heating step were changed and others were set to the same conditions as those of Sample E13 in this example, so that substrates on which another two kinds of electron conductive and corrosion-resistant materials were formed (Samples E14 to E15) were manufactured.

Sample E14 was manufactured by heating the substrate to which the boron nitride powder adhered in the heating step at a temperature of 900° C. for 20 minutes.

Sample E15 was manufactured by heating the substrate to which the boron nitride powder adhered in the heating step at a temperature of 1000° C. for 20 minutes Further, in this example, like in Example 5, a thermal spraying step and a nitriding step were performed to manufacture an electron conductive and corrosion-resistant material (Sample E16) on a substrate made of titanium.

Specifically, first, a Ti plate (JIS first class), which was manufactured by Kobe Steel, Ltd. and had a thickness of 0.6 mm, was prepared as the metal substrate.

After that, like in Example 5, the metal substrate was heated at a temperature of about 60° C., and $TiB_2$ powder was sprayed onto both surfaces of the metal substrate by plasma spraying so that a $TiB_2$ layer 21 was formed (thermal spraying step). The same powder as that of Example 5 was used as the $TiB_2$ powder. Further, as for the plasma spraying, $Ar$—$N_2$ spraying was performed by the same apparatus as that in Example 5 under conditions where a spraying distance was 100 mm, a feed rate of $TiB_2$ powder was 32.8 g/min, a ratio of $Ar:N_2$ was 50:50 (L/min), and current was 500 A. Subsequently, the metal substrate on which the $TiB_2$ layer was formed was placed in a heating furnace, the substrate was heated in a nitrogen gas stream at a temperature of 1000° C. for 2 hours, and nitrogen gas flowed into the heating furnace at a flow rate of 0.5 L/min (nitriding step). In this way, a substrate (Sample E16) on which the film of the electron conductive and corrosion-resistant material containing at least titanium, boron, and nitrogen was formed was manufactured by nitriding the $TiB_2$ layer formed on the metal substrate.

Furthermore, in this example, like in Example 4, a boriding step and a nitriding step were performed to manufacture an electron conductive and corrosion-resistant material (Sample E16) on a substrate made of titanium.

Specifically, first, a Ti plate (JIS first class), which was manufactured by Kobe Steel, Ltd. and had a thickness of 0.6 mm, was prepared as the substrate.

After that, like in Example 4, mixed molten salt composed of 10 wt % of $K_2O$ and 90 wt % of $B_2O_3$ (temperature: 950 to 1000° C.) was prepared, the substrate was immersed in the mixed molten salt, and it was electrolyzed (current density: about 0.1 A/cm$^2$) in the mixed molten salt for 10 minutes while the substrate was used as a negative electrode and a graphite rod having $\phi$13 mm was used as a positive electrode (boriding step). Accordingly, a Ti-boride layer, which contained at least Ti and B, was formed on the surface of the substrate by boriding the surface of the substrate. Subsequently, the molten salt adhering to the substrate was dissolved and washed with warm water. Next, like in Example 4, the substrate on which the Ti-boride layer was formed was placed in a heating furnace, the substrate was heated in a nitrogen gas stream at a temperature of 1000° C. for 2 hours, and nitrogen gas flowed into the heating furnace at a flow rate of 0.5 L/min (nitriding step).

In this way, the substrate (Sample E17) on which the film of the electron conductive and corrosion-resistant material containing at least titanium, boron, and nitrogen was formed was manufactured by nitriding the Ti-boride layer formed on the substrate.

In this example, gas nitriding was further performed on the electron conductive and corrosion-resistant material, which was manufactured on the substrate by the adhesion step and the heating step, to manufacture the electron conductive and corrosion-resistant material.

That is, first, like Sample E15 of this example, an adhesion step and a heating step (provided that heating conditions: 1000° C. and 30 minutes) were performed to manufacture the substrate on which the electron conductive and corrosion-resistant material was formed on the surface. The substrate on which the electron conductive and corrosion-resistant material was formed was placed in a heating furnace, and was heated in a nitrogen gas stream at a temperature of 1000° C. for 2 hours, so that the electron conductive and corrosion-resistant material formed on the substrate was further nitrided (nitriding step). In this case, nitrogen gas flowed into the heating furnace at a flow rate of 0.5 L/min. In this way, the substrate including further nitrided electron conductive and corrosion-resistant material on the surface thereof, was manufactured. This is referred to as Sample E18.

Further, in this example, for the purpose of the comparison with Samples E13 to E18, three kinds of substrates (Samples C14 to C16) were manufactured.

Sample C14 is a titanium plate (JIS first class) that is manufactured by Kobe Steel, Ltd. and has a thickness of 0.6 mm.

Sample C15 was manufactured by forming a TiN film on the surface of a titanium plate by ion plating.

Sample C16 is a substrate that is manufactured by forming a $TiB_2$ layer formed of $TiB_2$ particles on the surface of a Ti plate (titanium plate (JIS first class) manufactured by Kobe Steel, Ltd. and having a thickness of 0.6 mm). In order to manufacture the sample, like Sample E16, a titanium plate of JIS first class was heated at a temperature of about 60° C., plasma spraying (Ar—$N_2$ spraying) was performed, and $TiB_2$ powder was sprayed onto both surfaces of the titanium plate to form a $TiB_2$ layer.

After that, the composition of the surfaces of Samples E13 to E18 and C14 to C16, which were manufactured as described above, were measured.

Figure 31:
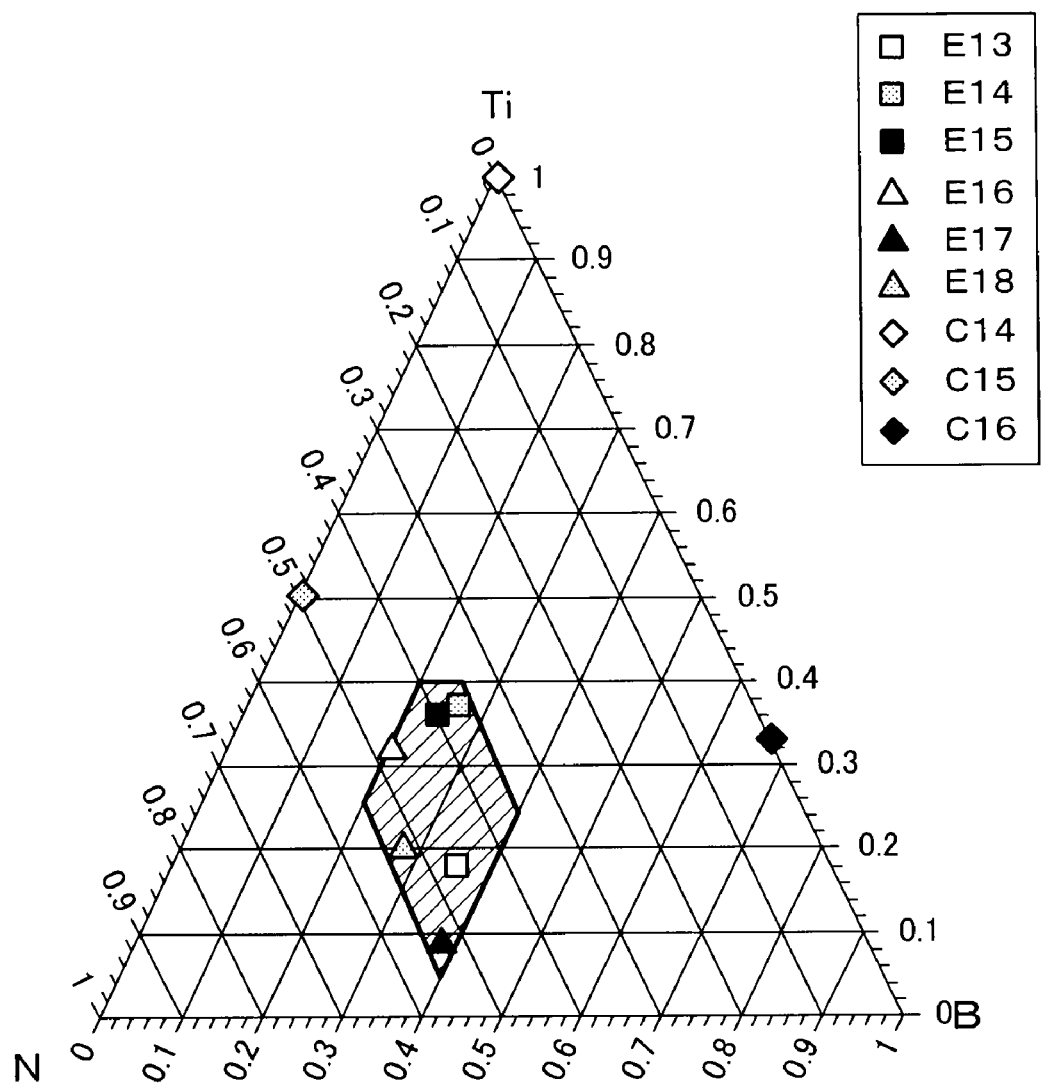
FIG. 31 is a view showing a ternary phase diagram of a Ti—B—N system on the surface of substrates (Samples E13 to E18 and C14 to C16) according to Example 6.

The composition was measured by an X-ray photoelectron spectroscopy (XPS). Quantera SXM manufactured by ULVAC-PHI Inc. was used as an XPS apparatus, and Monochromated A1 Kα was used as an X-ray source. An analysis area was set to 100×1500 μm. Further, the composition ratio of Ti, B, and N was measured by performing surface analysis on the surface of each of the samples. The results thereof are shown in FIG. 31 as a view showing a ternary phase diagram of a Ti—B—N system.

Furthermore, a corrosion test was performed on each of the samples (Samples E13 to E18 and C14 to C16), and a contact resistance value (mΩ·cm$^2$) was measured after the corrosion test. The corrosion test and the measurement of contact resistance were performed in the same manner as Example 1.

As for each sample, a contact resistance value before the corrosion test begins to be performed (0 hour), a contact resistance value when the corrosion test is performed for 48 hours, and a contact resistance value when the corrosion test is performed for 96 hours are shown in Table 1. Meanwhile, since a contact resistance value of Sample C15 when the corrosion test was performed for 48 hours was already significantly large, the measurement of the contact resistance value when the corrosion test was performed for 96 hours was not performed.

TABLE 1

| sample No. | elemental composition ratio | | | contact resistance value (mΩ · cm$^2$) of corrosion test | | |
|---|---|---|---|---|---|---|
| | B | N | Ti | 0 hour | 48 hours | 96 hours |
| E13 | 0.35 | 0.47 | 0.18 | 7.6 | 50 | 82.48 |
| E14 | 0.26 | 0.37 | 0.37 | 5.48 | 44 | 40.6 |
| E15 | 0.24 | 0.4 | 0.36 | 5 | 26.72 | 17.44 |
| E16 | 0.2 | 0.48 | 0.32 | 3.4 | 6.96 | 7.12 |
| E17 | 0.38 | 0.53 | 0.09 | 10 | 8 | 9 |
| E18 | 0.27 | 0.52 | 0.21 | 5.68 | 7.92 | 11.44 |
| C14 | 0 | 0 | 1 | 25.32 | 107.12 | 563.2 |
| C15 | 0 | 0.5 | 0.5 | 5.96 | 2116 | — |
| C16 | 0.67 | 0 | 0.33 | 25.24 | 36.28 | excess 3000 |

As shown in FIG. 31, the atomic ratio of titanium (Ti), boron (B), and nitrogen (N) of Samples E13 to E18 satisfies 0.05≦[Ti]≦0.40, 0.20≦[B]≦0.40, 0.35≦[N]≦0.55, and [Ti]+[B]+[N]=1 (within hatched areas in FIG. 31). Even after the corrosion test is performed for 100 hours, each of Samples E13 to E18 has a significantly low contact resistance value of 100 mΩ cm$^2$ or less as shown in Table 1. Accordingly, it is understood that each of Samples E13 to E18 has excellent corrosion resistant and electron conductivity.

Meanwhile, contact resistance of Sample C14 composed of a titanium plate exceeded 100 mΩ·cm$^2$ after the corrosion test was performed for 48 hours, and was increased up to exceeding 550 mΩ·cm$^2$ after the corrosion test was performed for 96 hours. Further, contact resistance of Sample C15 including a TiN layer on the surface thereof, was sufficiently low before the corrosion test was performed, but was rapidly increased up to a significantly high contact resistance exceeding 2000 mΩ·cm$^2$ after the corrosion test was performed for 48 hours. Furthermore, contact resistance of Sample C16 including a $TiB_2$ layer formed on the surface thereof by plasma spraying, was relatively low until the corrosion test was performed for 48 hours, but was increased up to significantly high contact resistance exceeding 3000 mΩ·cm$^2$ after the corrosion test was performed for 96 hours.

Therefore, according to this example, it is understood that the electron conductive and corrosion-resistant material, which contains titanium (Ti), boron (B), and nitrogen (N) in an atomic ratio satisfying $0.05 \leq [Ti] \leq 0.40$, $0.20 \leq [B] \leq 0.40$, and $0.35 \leq [N] \leq 0.55$, (provided that $[Ti]+[B]+[N]=1$) has excellent corrosion resistance and electron conductivity.

The invention claimed is:

1. An electron conductive and corrosion-resistant material comprising at least titanium, boron, and nitrogen,
    wherein titanium (Ti), boron (B), and nitrogen (N) are contained in an atomic ratio satisfying $0.05 \leq [Ti] \leq 0.40$, $0.20 \leq [B] \leq 0.40$, and $0.35 \leq [N] \leq 0.55$, provided that $[Ti]+[B]+[N]=1$,
    and said material shows peaks when $2\theta$ is $29.1 \pm 0.1°$, $41.7 \pm 0.1°$, and $42.2 \pm 0.1°$, and no peaks when $2\theta$ is $46.4 \pm 0.1°$ and $48.9 \pm 0.1°$, in an XRD pattern by a Cu-K$\alpha$ ray.

2. The electron conductive and corrosion-resistant material according to claim 1, wherein the electron conductive and corrosion-resistant material is formed as a film covering a substrate of which at least the surface is made of titanium or a titanium alloy.

3. The electron conductive and corrosion-resistant material according to claim 2, wherein the electron conductive and corrosion-resistant material formed on the substrate is used as a metal bipolar plate for a fuel cell together with the substrate.

4. A method of manufacturing the electron conductive and corrosion-resistant material of claim 1, wherein the method comprises:
    an adhesion step of making boron nitride powder adhere to the surface of a substrate of which at least the surface is made of titanium or a titanium alloy; and
    a heating step of forming a film of the electron conductive and corrosion-resistant material on the substrate by heating the substrate to which the boron nitride powder adheres under a non-oxidizing gas atmosphere or in a vacuum at a temperature of 500 to 1650° C.

5. The method of manufacturing an electron conductive and corrosion-resistant material according to claim 4, wherein the diameter of the boron nitride powder is in the range of 0.05 to 100μM.

6. The method of manufacturing an electron conductive and corrosion-resistant material according to claim 4, wherein the adhesion step includes:
    an application step of applying a boron nitride dispersion liquid, where the boron nitride powder is dispersed in a solvent, on the surface of the substrate; and
    a drying step of making the boron nitride powder adhere to the substrate by drying the substrate after the application step.

7. The method of manufacturing an electron conductive and corrosion-resistant material according to claim 4, wherein the heating temperature in the heating step is in the range of 700 to 1100° C.

8. The method of manufacturing an electron conductive and corrosion-resistant material according to claim 4, additionally comprising:
    a nitriding step of heating the substrate, on which the heating step has been performed, under an inert gas atmosphere including nitrogen gas or ammonia gas.

9. The method of manufacturing an electron conductive and corrosion-resistant material according to claim 8, wherein the heating temperature in the nitriding step is in the range of 700 to 1100° C.

10. The method of manufacturing an electron conductive and corrosion-resistant material according to claim 4, additionally comprising:
    a nitriding step of heating the substrate, on which the heating step has been performed, in a nitrogen gas stream.

11. The method of manufacturing an electron conductive and corrosion-resistant material according to claim 4, wherein the electron conductive and corrosion-resistant material formed on the substrate is used as a metal bipolar plate for a fuel cell together with the substrate.

12. A method of manufacturing the electron conductive and corrosion-resistant material of claim 1, wherein the method comprises:
    a boriding step of forming a Ti-boride layer which contains at least Ti and B on the surface of a substrate by boriding the surface of the substrate of which at least the surface is made of titanium or a titanium alloy; and
    a nitriding step of forming the film of the electron conductive and corrosion-resistant material on the substrate by nitriding the Ti-boride layer.

13. The method of manufacturing an electron conductive and corrosion-resistant material according to claim 12, wherein a molten salt electrolyzing method using boric-acid-based molten salt is utilized in the boriding step.

14. The method of manufacturing an electron conductive and corrosion-resistant material according to claim 12, wherein the substrate on which the Ti-boride layer is formed is heated in the nitriding step under an inert gas atmosphere including nitrogen gas or ammonia gas.

15. The method of manufacturing an electron conductive and corrosion-resistant material according to claim 12, wherein the substrate on which the Ti-boride layer is formed is heated in the nitriding step in a nitrogen gas stream.

16. The method of manufacturing an electron conductive and corrosion-resistant material according to claim 12, wherein the substrate on which the Ti-boride layer is formed is heated at a temperature of 700 to 1100° C. in the nitriding step.

17. The method of manufacturing an electron conductive and corrosion-resistant material according to claim 12, wherein the electron conductive and corrosion-resistant material formed on the substrate is used as a metal bipolar plate for a fuel cell together with the substrate.

18. A method of manufacturing the electron conductive and corrosion-resistant material of claim 1, wherein the method comprises, wherein the method comprises:
    a thermal spraying step of forming a $TiB_2$ layer formed of $TiB_2$ particles by spraying $TiB_2$ powder onto at least a part of the surface of a metal substrate; and
    a nitriding step of forming the film of the electron conductive and corrosion-resistant material on the metal substrate by nitriding the $TiB_2$ layer.

19. The method of manufacturing an electron conductive and corrosion-resistant material according to claim 18, wherein the metal substrate on which the $TiB_2$ layer is formed is heated in the nitriding step under an inert gas atmosphere including nitrogen gas or ammonia gas.

20. The method of manufacturing an electron conductive and corrosion-resistant material according to claim 18, wherein the metal substrate on which the $TiB_2$ layer is formed is heated in the nitriding step in a nitrogen gas stream.

21. The method of manufacturing an electron conductive and corrosion-resistant material according to claim 18, wherein the metal substrate on which the $TiB_2$ layer is formed is heated at a temperature of 700 to 1100° C. in the nitriding step.

22. The method of manufacturing an electron conductive and corrosion-resistant material according to claim 18, wherein the electron conductive and corrosion-resistant material formed on the metal substrate is used as a metal bipolar plate for a fuel cell together with the metal substrate.

* * * * *